United States Patent [19]
Matsushita et al.

[11] Patent Number: 5,475,442
[45] Date of Patent: Dec. 12, 1995

[54] TELEVISION SIGNAL PROCESSOR FOR PROCESSING ANY OF A PLURALITY OF DIFFERENT TYPES OF TELEVISION SIGNALS

[75] Inventors: Akira Matsushita, Fukaya; Hiroyuki Iga, Yokohama; Masahiro Yamada, Kawasaki; Kiyoshi Hoshino, Yokohama, all of Japan

[73] Assignee: Kabushiki Kaisha Toshiba, Kawasaki, Japan

[21] Appl. No.: 116,990

[22] Filed: Sep. 7, 1993

[30] Foreign Application Priority Data

| Sep. 7, 1992 | [JP] | Japan | 4-238250 |
| Sep. 7, 1992 | [JP] | Japan | 4-238252 |
| Sep. 7, 1992 | [JP] | Japan | 4-238380 |

[51] Int. Cl.$^6$ .............................. H04N 5/46; H04N 7/01
[52] U.S. Cl. .................. 348/554; 348/474; 348/445; 348/556
[58] Field of Search .................... 348/445, 449, 348/450, 458, 500, 521, 432, 473, 474, 554, 555, 556, 558, 441; H04N 5/46, 7/01

[56] References Cited

U.S. PATENT DOCUMENTS

| 4,872,054 | 10/1989 | Gray et al. | 348/445 |
| 5,132,793 | 7/1992 | Hirahata et al. | 348/445 |
| 5,218,436 | 6/1993 | Sugiyama et al. | 348/441 |

FOREIGN PATENT DOCUMENTS

| 0003182 | 7/1979 | European Pat. Off. | H04N 5/46 |
| 0456923 | 11/1991 | European Pat. Off. | H04N 5/46 |
| 0495574 | 7/1992 | European Pat. Off. | H04N 5/46 |
| 0529442 | 3/1993 | European Pat. Off. | H04N 5/46 |
| 195280 | 8/1991 | Japan | H04N 5/46 |
| 8605644 | 9/1986 | WIPO | H04N 5/46 |

OTHER PUBLICATIONS

Patent Abstracts of Japan, vol. 15, No. 498 (E-1146) 17 Dec. 1991 & JP-A-03 218 192 (Hitachi) 25 Sep. 1991 *abstract*.

Murakami, "A Proposed Universal Signal-Processing System", SMPTE Journal, vol. 96, No. 6, Jun. 1987, pp. 527-531.

Miyajima et al: "36-Inch Hi-Vision Television Reveiver TH-36HD1", National Technical Report, vol. 37, No. 5, Oct. 1991.

Primary Examiner—James J. Groody
Assistant Examiner—Glenton B. Burgess
Attorney, Agent, or Firm—Cushman Darby & Cushman

[57] ABSTRACT

A television signal processor selectively processing each television signal transmitted by a plurality of different television systems and displaying the processed television signal using any of multiple displays having different synchronizing frequencies and aspect ratios. The television signal processor includes a signal processing device for decoding a received signal in accordance with the system generating the received television signal, and a control mechanism for processing a television signal from the signal processing device in accordance with specification data corresponding to a display for displaying the television signal.

7 Claims, 23 Drawing Sheets

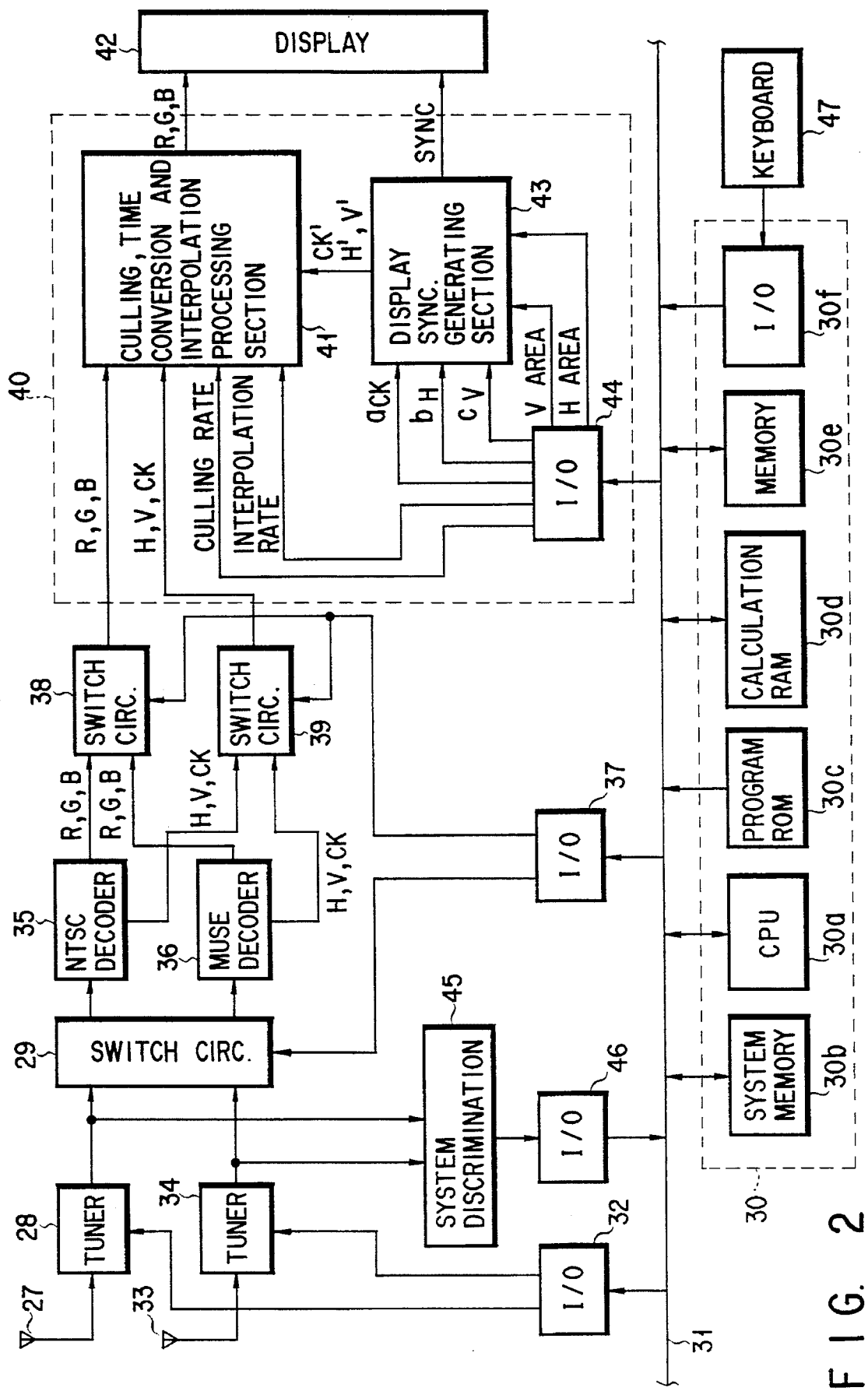
F I G. 2

FIG. 3

HORIZONTAL FREQUENCY 15.75 KHZ
VERTICAL FREQUENCY 59.94 HZ
ASPECT RATIO 4:3
CULLING RATE 20→7 (NUMBER OF LINES)

MUSE SYSTEM
1125 LINES → 393 LINES
DISPLAY OF 4:3

FIG. 5A $\ell 1 \xrightarrow{x1} \ell 1'$ $\ell 2 \quad \ell 3 \quad \ell 4 \xrightarrow{x0.7} \ell 2' \xleftarrow{x0.3} \ell 5$ $\ell 6 \quad \ell 7 \xrightarrow{x0.3} \ell 3' \xleftarrow{x0.7} \ell 8 \quad \ell 9 \quad \ell 10$ $\ell 11 \xrightarrow{x1} \ell 4'$

FIG. 5B $\ell 11 \xrightarrow{x1} \ell 4'$ $\ell 12 \quad \ell 13 \xrightarrow{x0.5} \ell 5' \xleftarrow{x0.5} \ell 14 \quad \ell 15$ $\ell 16 \xrightarrow{x1} \ell 6'$ $\ell 17 \quad \ell 18 \xrightarrow{x0.5} \ell 7' \xleftarrow{x0.5} \ell 19 \quad \ell 20$ $\ell 21 \xrightarrow{x1} \ell 8'$

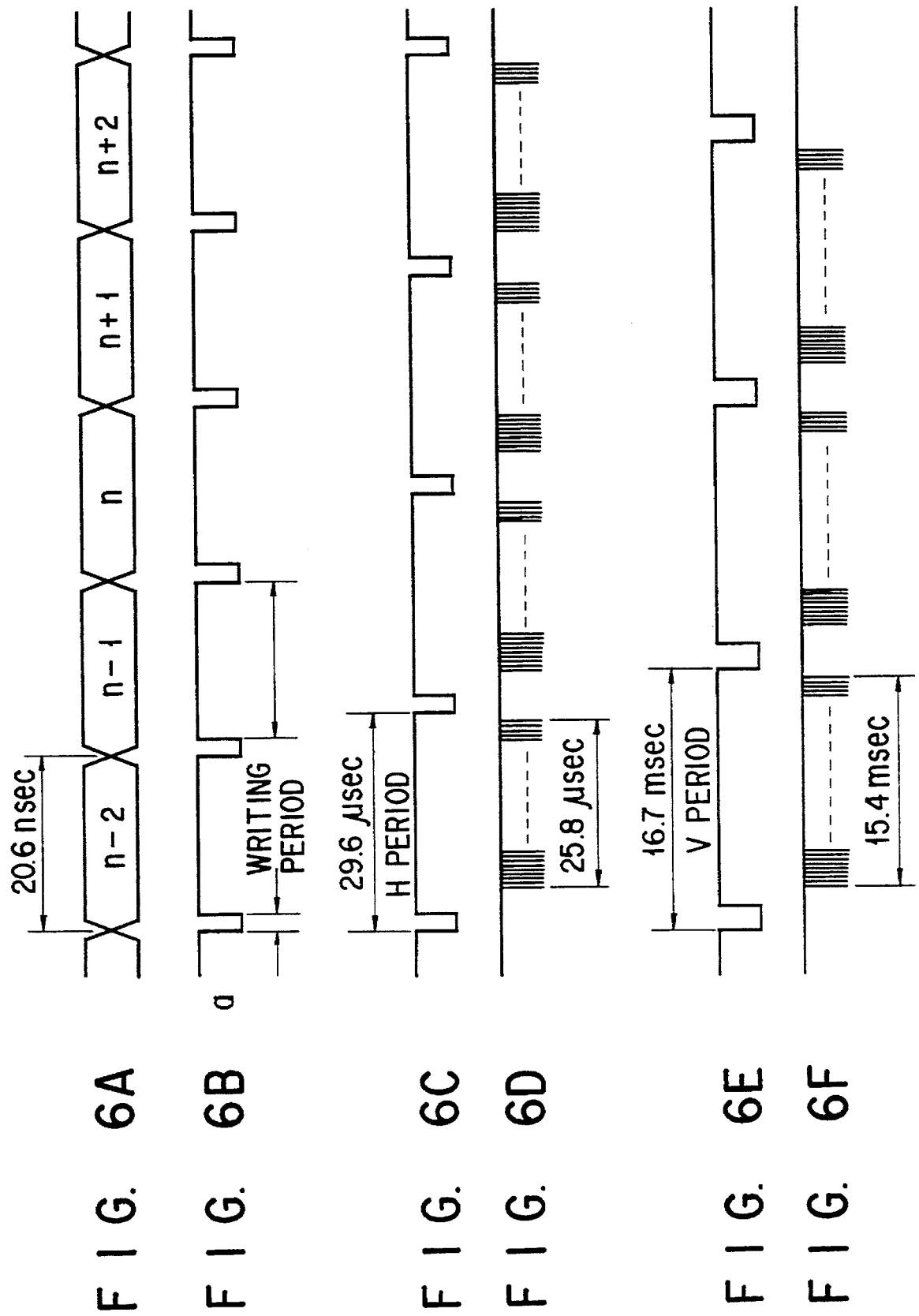

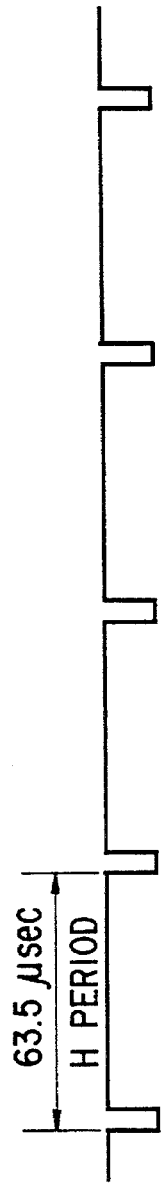
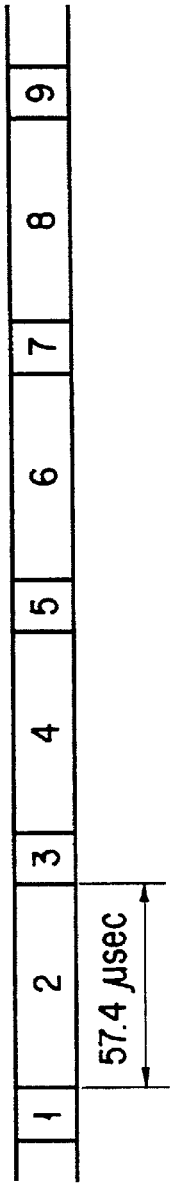
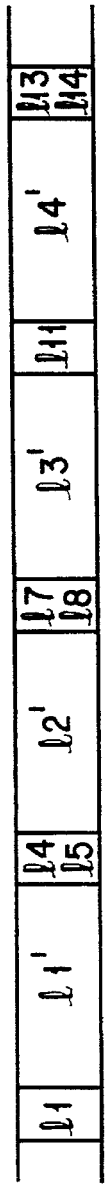
FIG. 7A
FIG. 7B
FIG. 7C
FIG. 8
| PERIOD | MULTIPLIER 63 | MULTIPLIER 67 | OUTPUT |
|---|---|---|---|
| 1 | ℓ1 × 1 | — | ℓ1' |
| 3 | ℓ4 × 0.7 | ℓ5 × 0.3 | ℓ2' |
| 5 | ℓ7 × 0.3 | ℓ8 × 0.7 | ℓ3' |
| 7 | ℓ11 × 1 | — | ℓ4' |
| 9 | ℓ13 × 0.5 | ℓ14 × 0.5 | ℓ5' |

| REGISTER 71 | REGISTER 72 |
|---|---|
| 1 | 0 |
| 0.7 | 0.3 |
| 0.3 | 0.7 |
| 1 | 0 |
| 0.5 | 0.5 |
| 1 | 0 |
| 0.5 | 0.5 |
| ⋮ | ⋮ |
F I G. 9
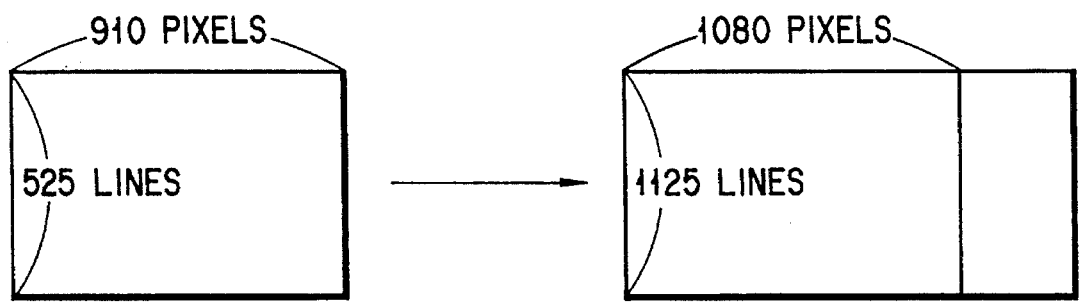
NTSC SYSTEM
HORIZONTAL FREQUENCY 33.75 KHz
VERTICAL FREQUENCY 60 Hz
ASPECT RATIO 16 : 9
INTERPOLATION RATE
        1.2 TIMES (H)
        2.1 TIMES (V)
F I G. 10

| | |
|---|---|
| $l_1'$ | $l_1 \times 1$ |
| $l_2'$ | $(l_1 \times 0.52) + (l_2 \times 0.48)$ |
| $l_3'$ | $(l_1 \times 0.06) + (l_2 \times 0.94)$ |
| $l_4'$ | $(l_2 \times 0.58) + (l_3 \times 0.42)$ |
| $l_5'$ | $(l_2 \times 0.1) + (l_3 \times 0.9)$ |
| $l_6'$ | $(l_3 \times 0.62) + (l_4 \times 0.38)$ |
| $l_7'$ | $(l_3 \times 0.15) + (l_4 \times 0.85)$ |
| $l_8'$ | $(l_4 \times 0.67) + (l_5 \times 0.33)$ |
| $l_9'$ | $(l_4 \times 0.19) + (l_5 \times 0.81)$ |
| $l_{10}'$ | $(l_5 \times 0.71) + (l_6 \times 0.29)$ |
| $l_{11}'$ | $(l_5 \times 0.24) + (l_6 \times 0.76)$ |
| $l_{12}'$ | $(l_6 \times 0.76) + (l_7 \times 0.24)$ |
| $l_{13}'$ | $(l_6 \times 0.29) + (l_7 \times 0.71)$ |
| $l_{14}'$ | $(l_7 \times 0.81) + (l_8 \times 0.19)$ |
| $l_{15}'$ | $(l_7 \times 0.33) + (l_8 \times 0.67)$ |
| $l_{16}'$ | $(l_8 \times 0.85) + (l_9 \times 0.15)$ |
| $l_{17}'$ | $(l_8 \times 0.38) + (l_9 \times 0.62)$ |
| $l_{18}'$ | $(l_9 \times 0.9) + (l_{10} \times 0.1)$ |
| $l_{19}'$ | $(l_9 \times 0.42) + (l_{10} \times 0.58)$ |
| $l_{20}'$ | $(l_{10} \times 0.94) + (l_{11} \times 0.06)$ |
| $l_{21}'$ | $(l_{10} \times 0.48) + (l_{11} \times 0.52)$ |
| $l_{22}'$ | $l_{11} \times 1$ |

FIG. 12

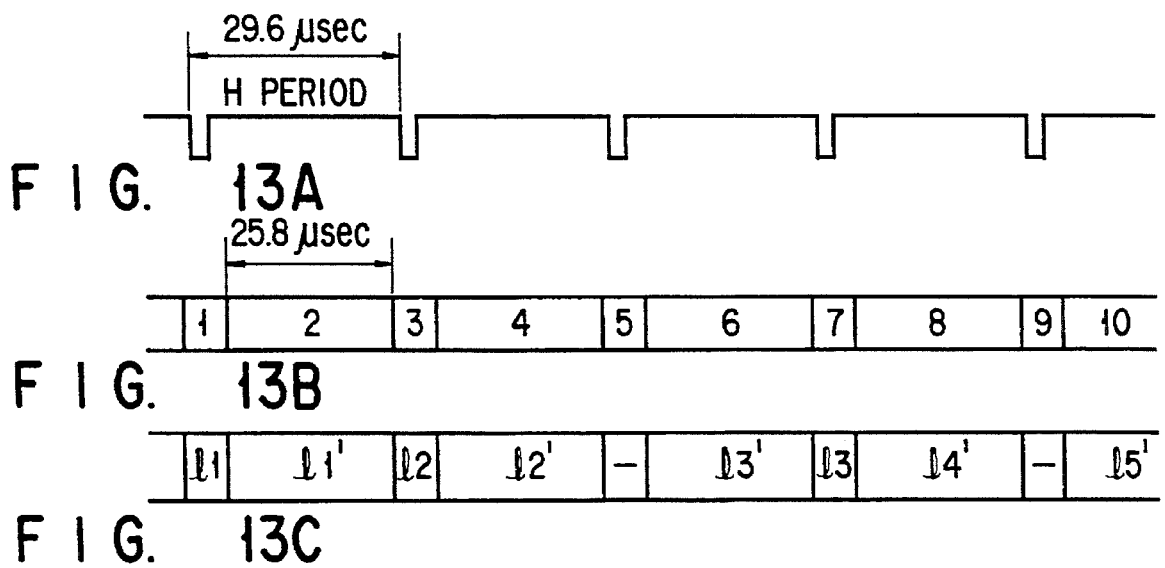
F I G. 13A
F I G. 13B
F I G. 13C
| CALCULATION PERIOD | REGISTER 71 | REGISTER 72 | REGISTER 73 | REGISTER 74 |
|---|---|---|---|---|
| 1 | 0.52 | 0.48 | 0 | 0 |
| 2 | 0.43 | 0.40 | 0.09 | 0.08 |
| 3 | 0.35 | 0.32 | 0.17 | 0.16 |
| 4 | 0.26 | 0.24 | 0.26 | 0.24 |
| 5 | 0.17 | 0.16 | 0.35 | 0.32 |
| 6 | 0.09 | 0.08 | 0.43 | 0.40 |
| 7 | 0.52 | 0.48 | 0 | 0 |
| 8 | 0.43 | 0.40 | 0.09 | 0.08 |
| 9 | 0.35 | 0.32 | 0.17 | 0.16 |
| 10 | 0.26 | 0.24 | 0.26 | 0.24 |
| 11 | 0.17 | 0.16 | 0.35 | 0.32 |
| 12 | 0.09 | 0.08 | 0.43 | 0.40 |
| 13 | 0.52 | 0.48 | 0 | 0 |
F I G. 15

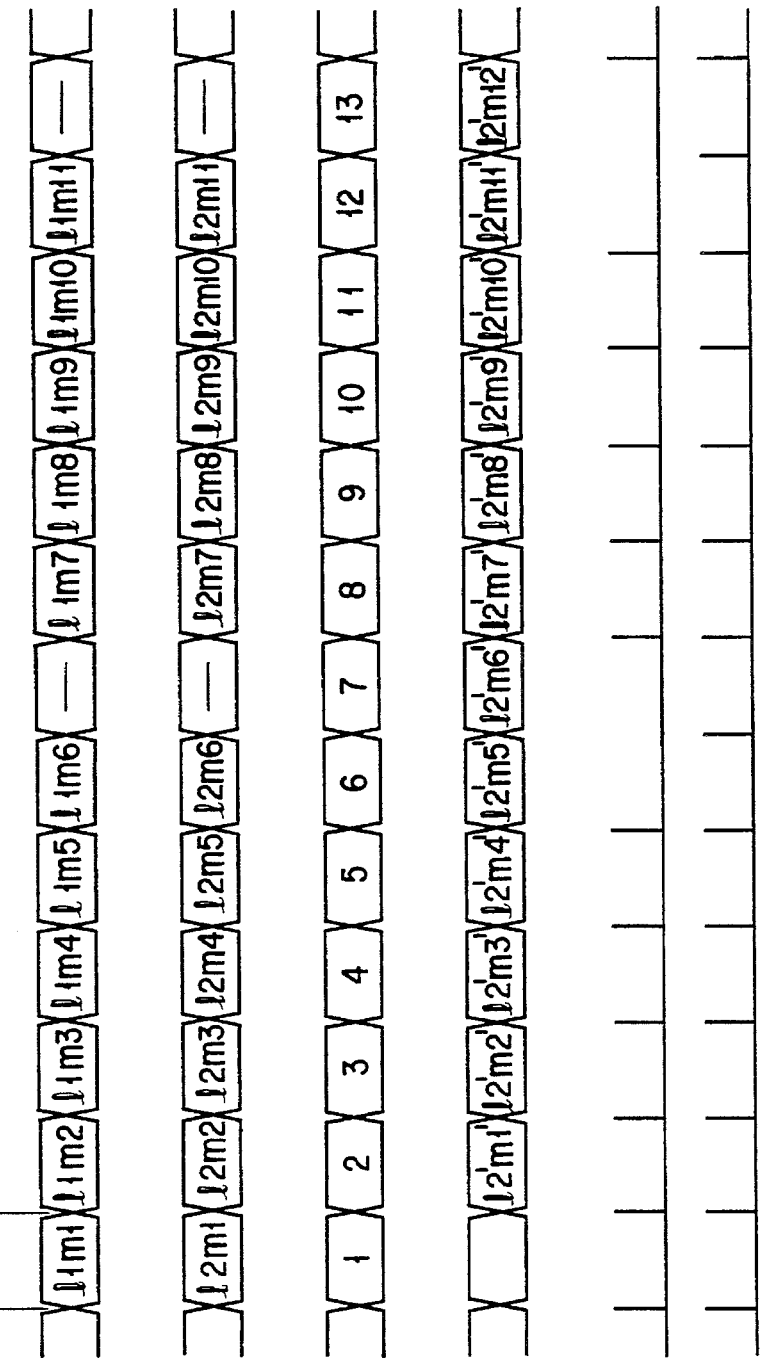

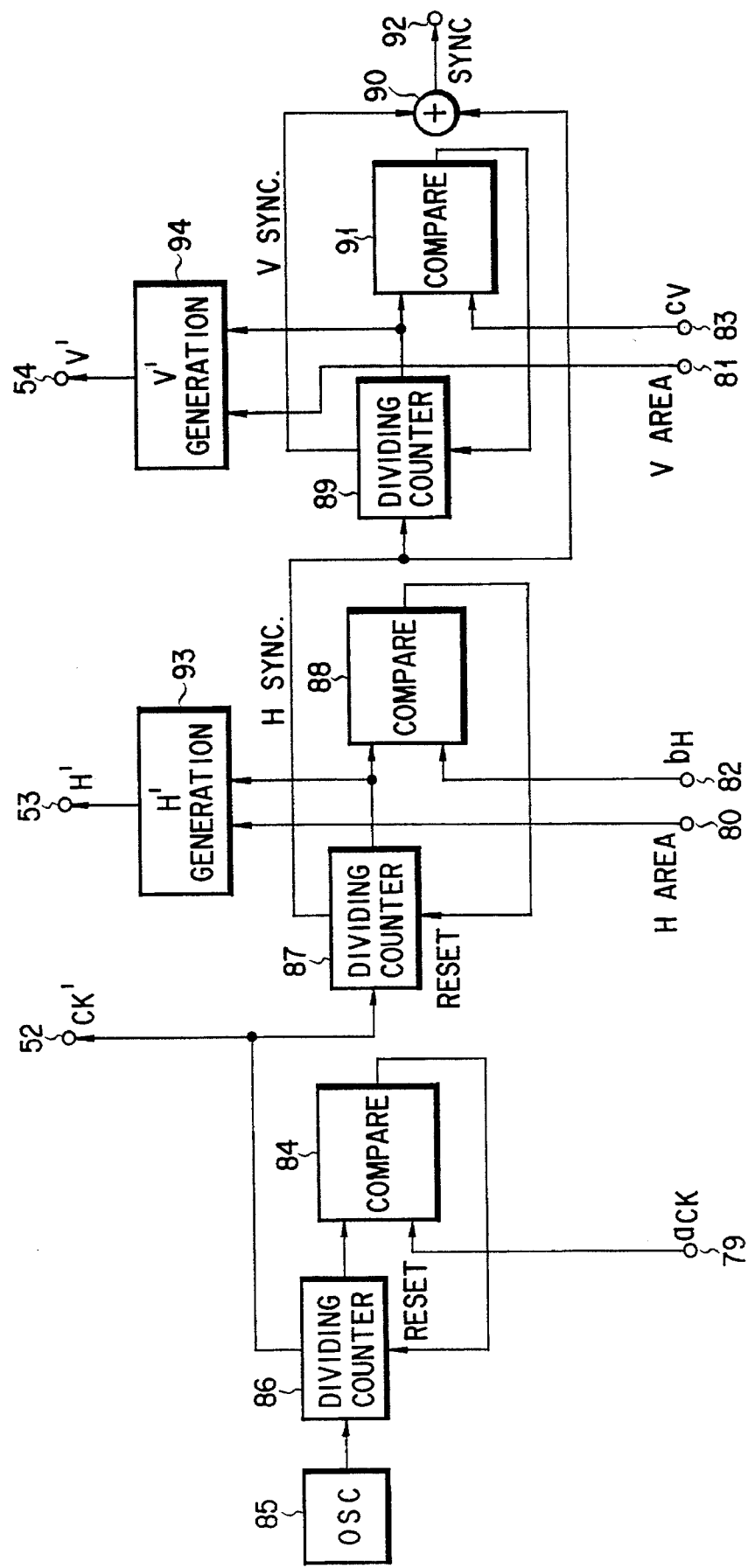
F I G. 16

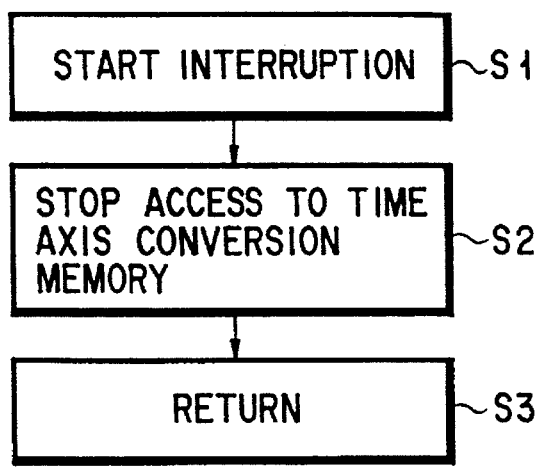
F I G. 17
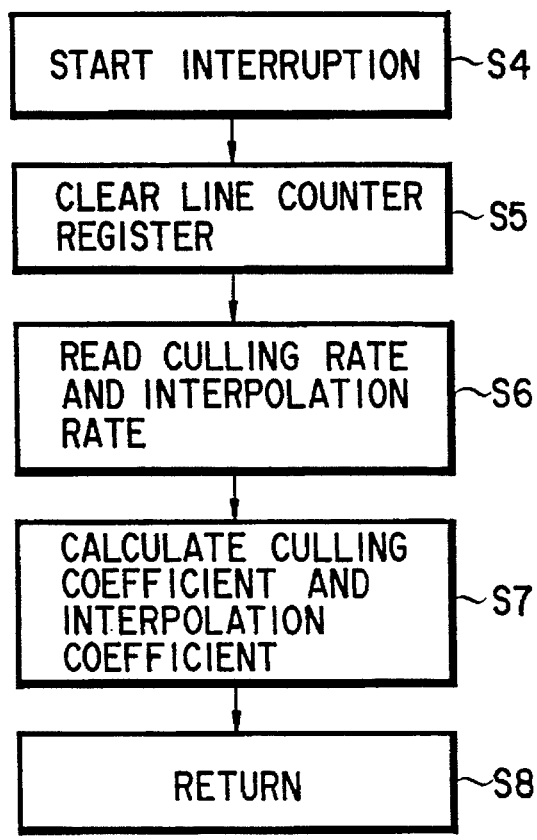
F I G. 18
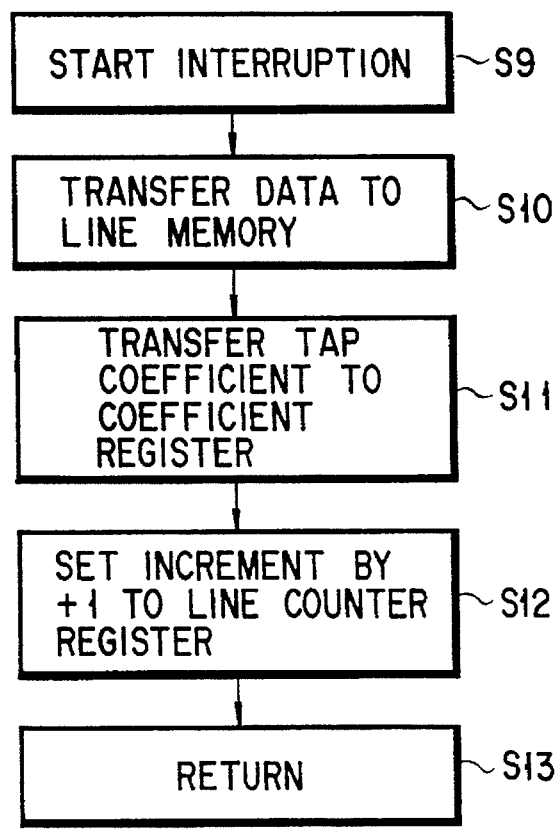
F I G. 19

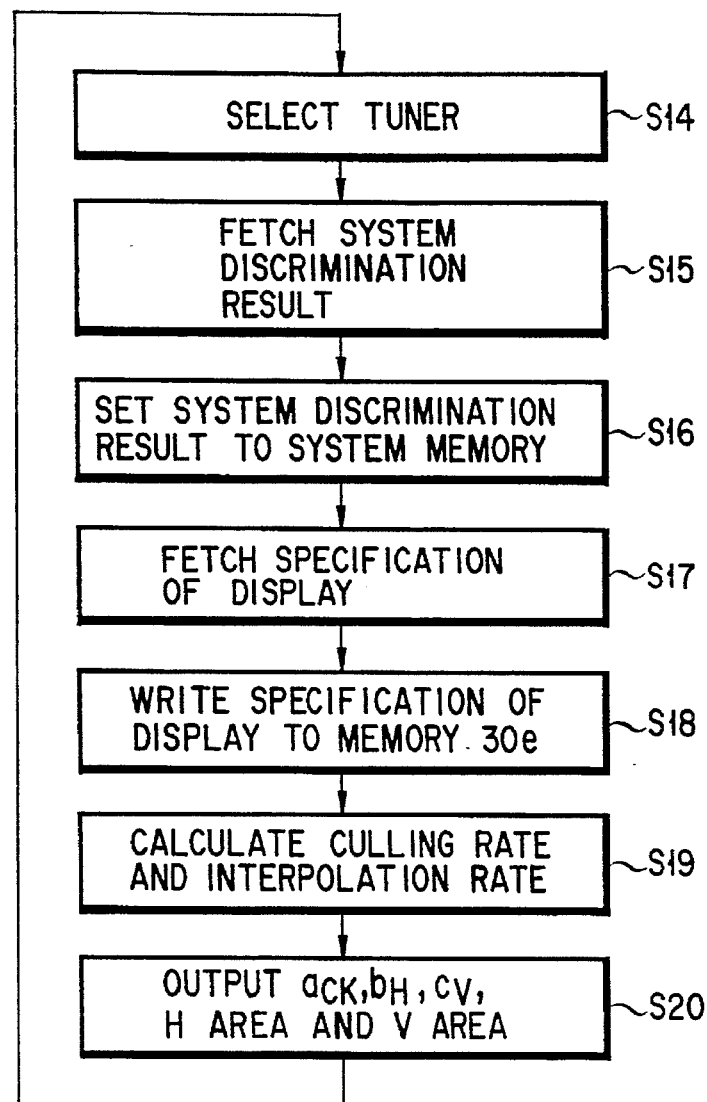
F I G. 20
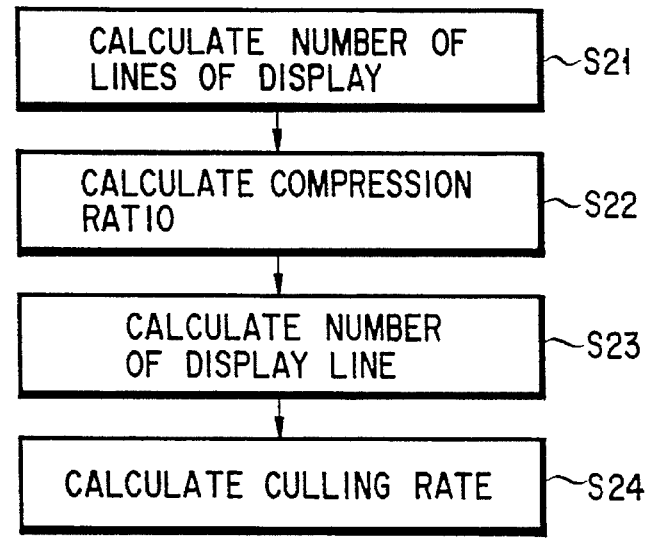
F I G. 21

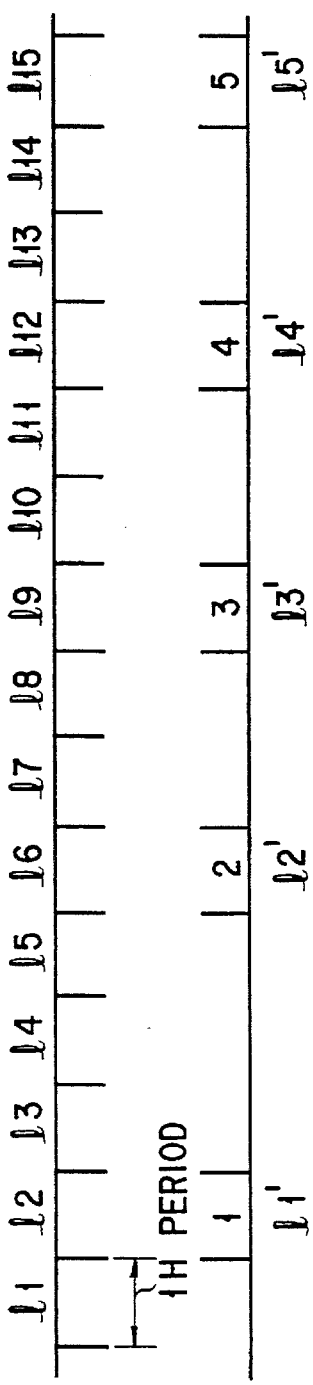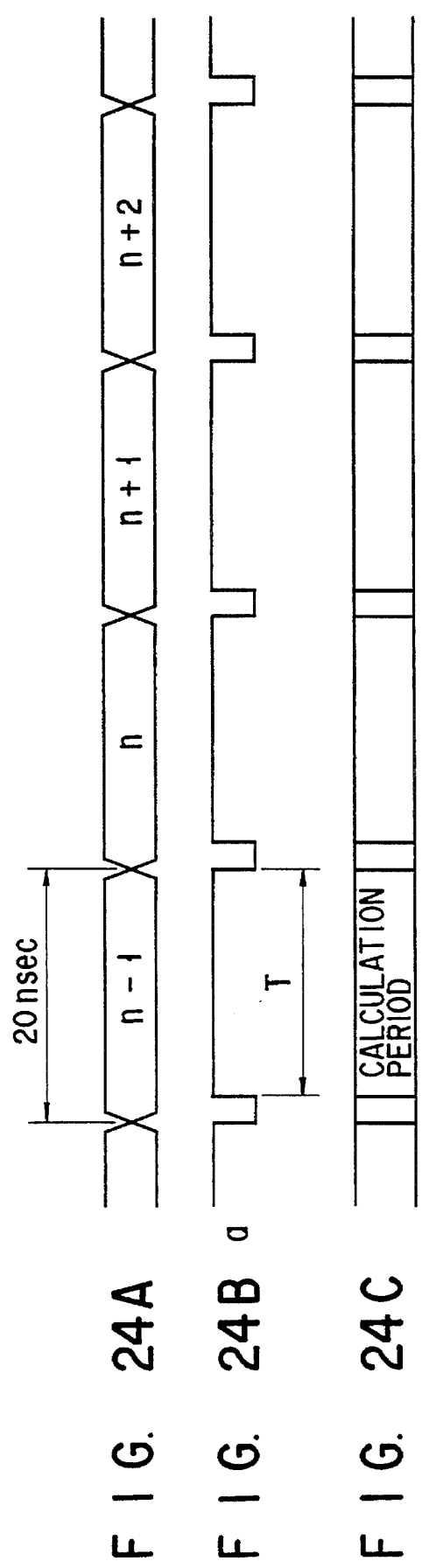

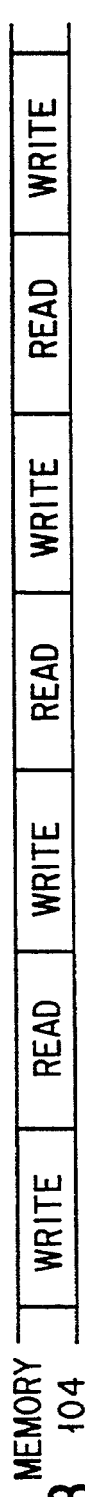
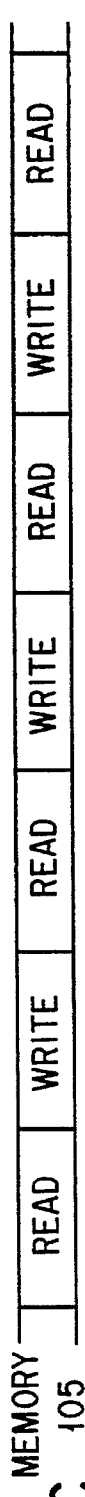
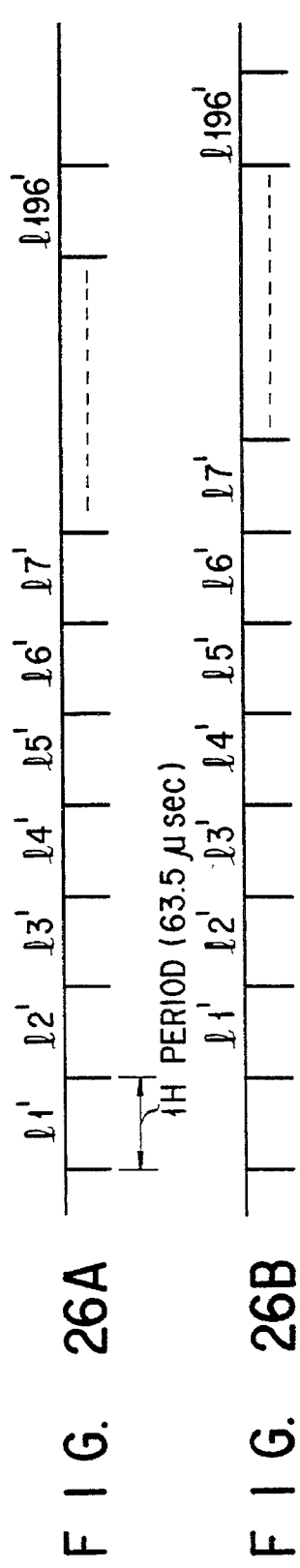

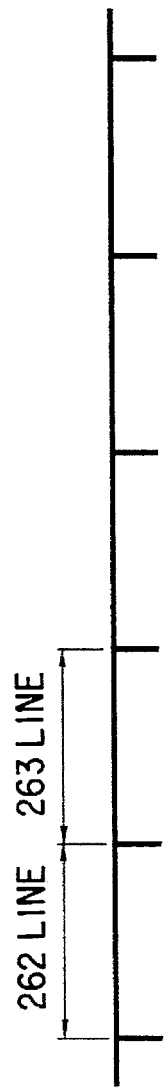
F I G. 27A
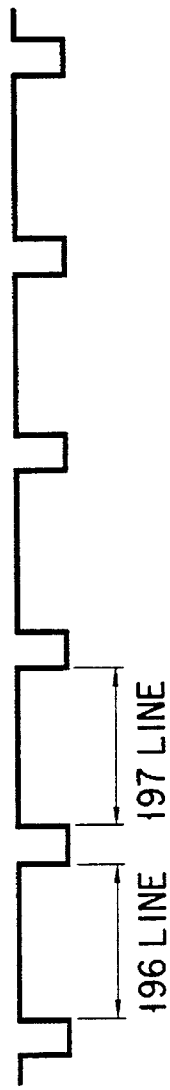
F I G. 27B
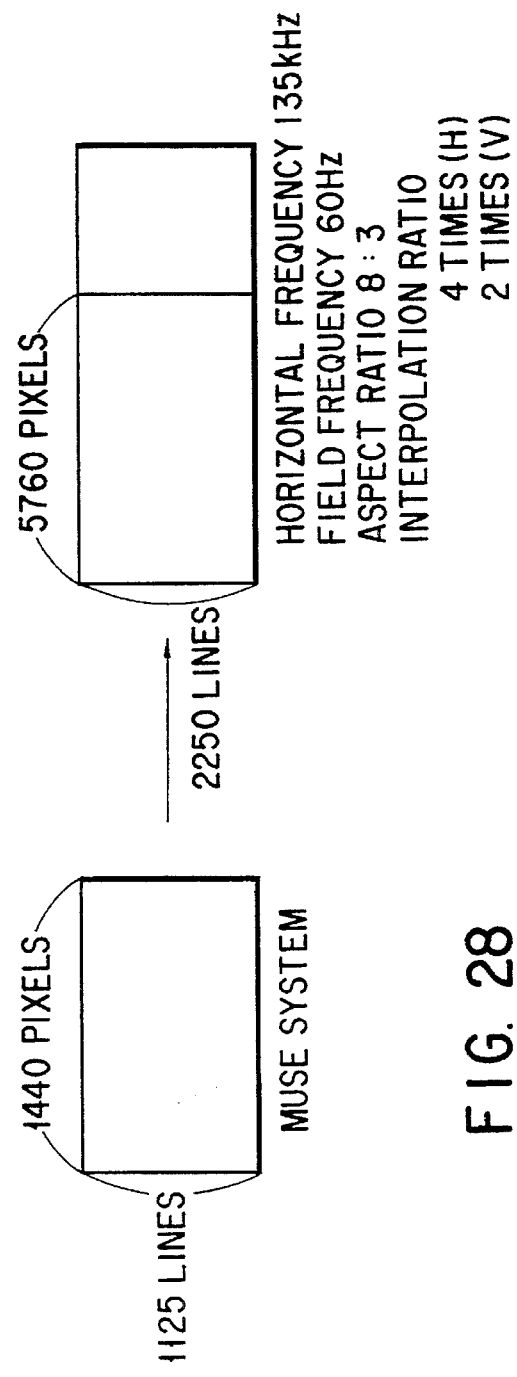
F I G. 28

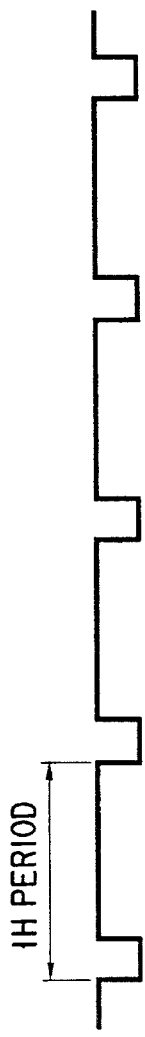
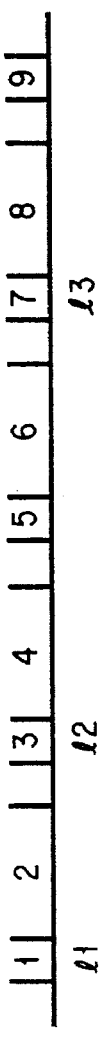
FIG. 32A
FIG. 32B
FIG. 32C
FIG. 33A OUTPUT OF MEMORY 123
FIG. 33B OUTPUT OF MEMORY 133
FIG. 33C CALCULATION PERIOD
FIG. 33D OUTPUT OF ADDER 127
FIG. 33E OUTPUT CLOCK OF MEMORY

F I G. 34

| REGISTER 135 | REGISTER 136 | REGISTER 137 | REGISTER 138 |
|---|---|---|---|
| 0.5 | 0.5 | 0 | 0 |
| 0.125 | 0.125 | 0.375 | 0.375 |
| 0.25 | 0.25 | 0.25 | 0.25 |
| 0.375 | 0.375 | 0.125 | 0.125 |
| 0.5 | 0.5 | 0 | 0 |
| 0.125 | 0.125 | 0 | 0 |
| ----- | ----- | ----- | ----- |

F I G. 35

| | CALCULATION PERIOD 1 | CALCULATION PERIOD 2 | CALCULATION PERIOD 3 | CALCULATION PERIOD 4 |
|---|---|---|---|---|
| MULTIPLIER 130 | $\ell_{1}m_{1} \times 0.5$ | $\ell_{1}m_{2} \times 0.125$ | $\ell_{1}m_{2} \times 0.25$ | $\ell_{1}m_{2} \times 0.375$ |
| MULTIPLIER 131 | $\ell_{2}m_{1} \times 0.5$ | $\ell_{2}m_{2} \times 0.125$ | $\ell_{2}m_{2} \times 0.25$ | $\ell_{2}m_{2} \times 0.375$ |
| MULTIPLIER 126 | — | $\ell_{1}m_{1} \times 0.375$ | $\ell_{1}m_{1} \times 0.25$ | $\ell_{1}m_{1} \times 0.125$ |
| MULTIPLIER 132 | — | $\ell_{2}m_{1} \times 0.375$ | $\ell_{2}m_{1} \times 0.25$ | $\ell_{2}m_{1} \times 0.125$ |
| OUTPUT | $\ell'_{1 1}m'_{1 0}$ | $\ell'_{1 1}m'_{1 1}$ | $\ell'_{1 1}m'_{1 2}$ | $\ell'_{1 1}m'_{1 3}$ |

TELEVISION SIGNAL PROCESSOR FOR PROCESSING ANY OF A PLURALITY OF DIFFERENT TYPES OF TELEVISION SIGNALS

BACKGROUND OF THE INVENTION

1. Field of the Invention

The present invention relates to a television signal processor for processing different types of television signals transmitted by a different of television systems, e.g., a television signal of an NTSC system or a high definition television signal, and more particularly to a television signal processor, which can display the signal-processed television signal on a large number of types of displays having different synchronizing frequencies and aspect ratios such as a CRT (Cathode Ray Tube) or a liquid crystal projector.

2. Description of the Related Art

Recently in addition to the normal NTSC television system, television signals from a plurality of systems, such as an EDTV system or a MUSE system can be received. Television receivers, are know which can receive a plurality of types of television signals. "National Technical Report Vol. 37 No. 5, Oct. 1991", for example, describes "36-inch type High Definition Receiver TH-36HD1." This television receiver can receive a high definition MUSE broadcast in addition to a BS/UHF/VHF/CATV broadcast of the current NTSC system.

FIG. 1 shows the structure or this type of television receiver. Reference numeral 11 denotes an antenna. Television signals of UHF/VHF/CATV broadcasts are received by the antenna 11. One of the television signal received by the antenna 11 is selected by a tuner 13, which is controlled by a system controller 12, and converted to a base band signal. Thereafter, the base band signal is supplied to one input terminal of a switch circuit 14. The tuner 13 receives the television signals of the normal NTSC system and an EDTV system, and processes each signal.

Reference numeral 15 denotes another antenna. Television signals from BS broadcasts are received by the antenna 15. One of the television signals received by the antenna 15 is selected by a tuner 16, which is controlled by the system controller 12, and converted to a base band signal. Thereafter, the base band signal is supplied to the other input terminal of the switch circuit 14. The tuner 16 receives television signals of the is a high definition MUSE type in addition to the television signals of the normal NTSC system and the EDTV system, and processes each signal.

The switch circuit 14 receives the respective base band signals output from the tuners 13 and 16 and separately outputs a selected one of the received signals to an NTSC decoder 17 and an MUSE decoder 18, 93 The NTSC decoder 17 converts the base band signals received thereby to the respective color signals R (Red), G (Green) and B (Blue), and outputs these signals to a scanning line converter 19.

The scanning line converter 19 converts 525 horizontal scanning lines, corresponding to the number of interlaced lines in the television signals of NTSC system are interlaced, to 525 non-interlaced signals (double-speed conversion). It then outputs these signals to a time compressor 20. The time compressor 20 compresses the received signals to adjust the aspect ratios for display of the respective color signals R, G, B on a CRT when these color signals are displayed on a wide screen. For instance, when the aspect ratio is 16:9, the respective color signals R, G, B are compressed to ¾ in a horizontal direction. The time-compressed color signals R, G, B are supplied to one input terminal of a switch circuit 21.

The MUSE decoder 18 processes the base band signal of MUSE system which is band-compressed to 8.1 kHz, converts the respective color signals R, G, B generated by the processing, and outputs these signals to the other input terminal of the switch circuit 21. The NTSC decoder 17 and the MUSE decoder 18 fetch a horizontal synchronizing signal H and a vertical synchronizing signal V from the inputted base band signals. The horizontal synchronizing signal H and the vertical synchronizing signal v, which are fetched by the NTSC decoder 17, are supplied to one input terminal of a switch circuit 22. The horizontal synchronizing signal H and the vertical synchronizing signal V, which are fetched by the MUSE decoder 18, are supplied to the other input terminal of the switch circuit 22.

The switch circuit 21 is switched to selectively supply color signals R, G, B, which are obtained by processing the base bands of NTSC system and color signals R, G, B, which are obtained by processing the base bands of MUSE system, to a CRT 23 based on the control of the system controller 12. The switch circuit 22 is switched synchronously with switch circuit 21 based on the control of the system controller 12. In other words, the switch circuit 22 is switched to supply the horizontal synchronizing signal H and the vertical synchronizing signal V, which correspond to the color signals R, G, B supplied to the CRT 23, to a deflection circuit 24.

The deflection circuit 24 is controlled by the system controller 12. When the CRT 23 performs the image-display based on the television signal of NTSC system, the deflection circuit 24 controls the CRT 23 based on the frequency of the horizontal synchronizing signal H of 31.5 kHz and that of the vertical synchronizing signal V of 59.94 Hz. Moreover, the frequency of the horizontal synchronizing signal H in the NTSC system is 15.75 kHz. However, since the television signal is converted at double speed by the scanning line converter 19, the frequency of the horizontal synchronizing signal H is doubled (31.5 kHz) to adjust to the double-speed conversion. Alternatively, when the CRT 23 performs the image-display based on the television signal of MUSE system, the deflection circuit 24 controls the CRT 23 based on the frequency of the horizontal synchronizing signal H of 33.75 kHz and that of the vertical synchronizing signal V of 60 Hz.

The system controller 12 is operated to control a series of tuning operation. For example, system controller 12 may operate based on commands outputted from a control section 26 of a remote-control which are received by receiver 25.

In the above-mentioned television receiver, there exists an integral structure formed from the tuners 13 and 16, to which the television signals are first received by the antennas 11 and 15 and the CRT 23, which actually displays the image. Further, the deflection circuit 24 selectively generates the horizontal and vertical synchronizing signals H and V to control the CRT 23. Therefore, the signal processing section for processing the received television signal corresponds with the display section for image-displaying the signal processed by the signal-processing section. In other words, the signal processing section is designed to correspond to only a particular the display section having a fixed synchronizing frequency and a fixed aspect ratio.

In sum, in conventional television receiver which are designed receive each television signals transmitted by one of a plurality of types of television systems, the signal processing section is designed to correspond to a particular display section having a fixed synchronizing frequency and a fixed aspect ratio. Consequently, the received television signal cannot be adapted to a large number of types of displays having a different synchronizing frequencies and different aspect ratios.

In general, the frequency of the horizontal synchronizing signal necessary for operating a display such as (i.e. CRT) is not limited to the above-mentioned two frequencies particularly when personal computers and work stations are considered. Specifically, many such frequencies may be necessary to accommodate the large number of displays available for personal computers, workstations and the like. For example, there is a horizontal synchronizing signal to be used for a graphic display whose frequency is over 100 kHz. Accordingly, it has become necessary to process the received television signals not only for display on predetermined CRTs but also for displays such as that for a personal computer. In other words, multi-media systems require processing of input signals for a varying number of possible display devices.

Particularly, in recent years, a liquid crystal projector using liquid crystal has been produced on a commercial basis. Soon, in addition to the liquid crystal projector whose current aspect ratio is 4:3 or 16:9, it is expected that the liquid crystal projector, which has an aspect ratio, equivalent to that of a movie screen, will be put into practical use in accordance with the large screen and high definition. Consequently in accordance with the development of the multimedia, it is expected that the signals having a different synchronizing frequencies and a different aspect ratios will become commonplace as shown in the television signals of MUSE and MUSE types in the near future.

In consideration of the above situation, the need for the television receiver such as that disclosed by this invention will dramatically increase.

Generally, in this invention the signal processing section and the display section are separated. The signal processing section can process each television signal transmitted by the plurality of types of the television systems. Furthermore, the processed television signal can be displayed by a large number of types of displays having different synchronizing frequencies and different aspect ratios.

SUMMARY OF THE INVENTION

In consideration of the above problems, an object of the present invention is to provide a television signal processor which can process each television signal transmitted by various types of television systems, and which can display the processed television signal by a large number of types of displays having different synchronizing frequencies and an aspect ratios.

According to one aspect of the present invention, there is provided a television signal processor comprising signal processing means for decoding an inputted television signal, based on a signal inputting the signal; and controlling means for processing, based on to a specification of a display for displaying the television signal, the television signal processed by the signal processing means.

According to the above-mentioned structure, the decoding is provided to the inputted television signal, and the processing is performed upon the television signal so that the processed television signal will correspond to the specification of the display for displaying the television signal. Therefore, the television signals transmitted by the various types of television systems can be processed, respectively, and the processed television signal can be displayed by the large number of types of displays having different synchronizing frequencies and aspect ratios.

BRIEF DESCRIPTION OF THE DRAWINGS

FIG. 2 is a block diagram showing an embodiment of a television signal processor of the present invention;

FIG. 3 is a view for explaining the relationship between the television signal of an MUSE system and that of an NTSC system in view of the screen in order to explain a culling processing in the embodiment of FIG. 2;

FIGS. 5A and 5B are views for explaining culling processing in a vertical direction according to the embodiment of FIG. 2, respectively;

FIGS. 6A to 6F are views for explaining a calculation timing when the culling processing is performed in the same vertical direction, respectively;

FIGS. 7A to 7C are views for explaining a writing time of data to a time axis conversion memory when the culling processing is performed in the same vertical direction, respectively;

FIG. 8 is a view for explaining the content of the multiplication of a multiplier when the culling processing is performed in the same vertical direction;

FIG. 9 is a view for explaining a tap coefficient set in a coefficient register when the culling processing is performed in the same vertical direction;

FIG. 10 is a view showing the relationship between the television signal of the NTSC system and that of the MUSE system in view of the screen in order to explain an interpolation processing according to the embodiment of the present invention;

FIG. 12 is a view for specifically explaining the content of the calculation when the interpolation processing is performed in the same vertical direction;

FIGS. 13A to 13C are views for explaining the operation timing when the interpolation processing is performed in the same vertical direction; respectively;

FIGS. 14A to 14F are views for explaining the operation timing when the interpolation processing is performed in the same horizontal direction; respectively;

FIG. 15 is a view for explaining the content of the tap coefficient which is sequentially set in the coefficient register when the interpolation processing is performed in the horizontal direction and the vertical direction;

FIG. 16 is a block diagram for explaining the details of a display synchronizing generating section used in the embodiment of the present invention;

FIG. 17 is a flow chart for explaining an interruption processing operation of a CPU used in the culling, time conversion and interpolation processing section according to the embodiment of the present invention;

FIG. 18 is a flow chart for explaining a vertical synchronizing interruption processing operation of the CPU used in the culling, time conversion and interpolation processing section according to the embodiment of the present invention;

FIG. 19 is a flow chart for explaining a horizontal synchronizing interruption processing operation of the CPU used in the culling, time conversion and interpolation processing section according to the embodiment of the present invention;

FIG. 20 is a flow chart for explaining the processing operation of the CPU used in the a system controller according to the present invention;

FIG. 21 is a flow chart for explaining the calculation processing of the culling rate of the system controller;

FIGS. 23A and 23B are views for explaining the calculation timing when the culling processing is performed in the vertical direction in the other example, respectively;

FIGS. 24A to 24C are views for explaining the calculation timing when the culling processing is performed in the horizontal direction in the other example, respectively;

FIGS. 25A to 25E are views for explaining the writing and reading time of data to/from a field memory when the culling processing is performed in the same vertical direction in the other example, respectively;

FIGS. 26A and 26B are views for explaining the writing and reading time of data to/from a line memory when the culling processing is performed in the same vertical direction, respectively;

FIGS. 27A and 27B are views for explaining a number of lines to be read from the same line memory for one vertical period, respectively;

FIG. 28 is a view for explaining the relationship between the television signal of the MUSE system and a high definition television signal in view of the screen in order to explain the interpolation processing in the other example;

FIGS. 32A to 32C are views for explaining the calculation timing when the interpolation processing is performed in the vertical direction in the other example, respectively;

FIGS. 33A to 33E are views for explaining the operation timing when the interpolation processing is performed in the horizontal direction in the other example, respectively;

FIG. 34 is a view for explaining the content of the tap coefficient which is sequentially set in the coefficient register when the interpolation processing is performed in the same horizontal direction and the vertical direction;

FIG. 35 is a view for explaining the content of the multiplication of the multiplier when the interpolation processing is performed in the same horizontal direction, and the vertical direction;

DETAILED DESCRIPTION OF THE PREFERRED EMBODIMENTS

Figure 1:
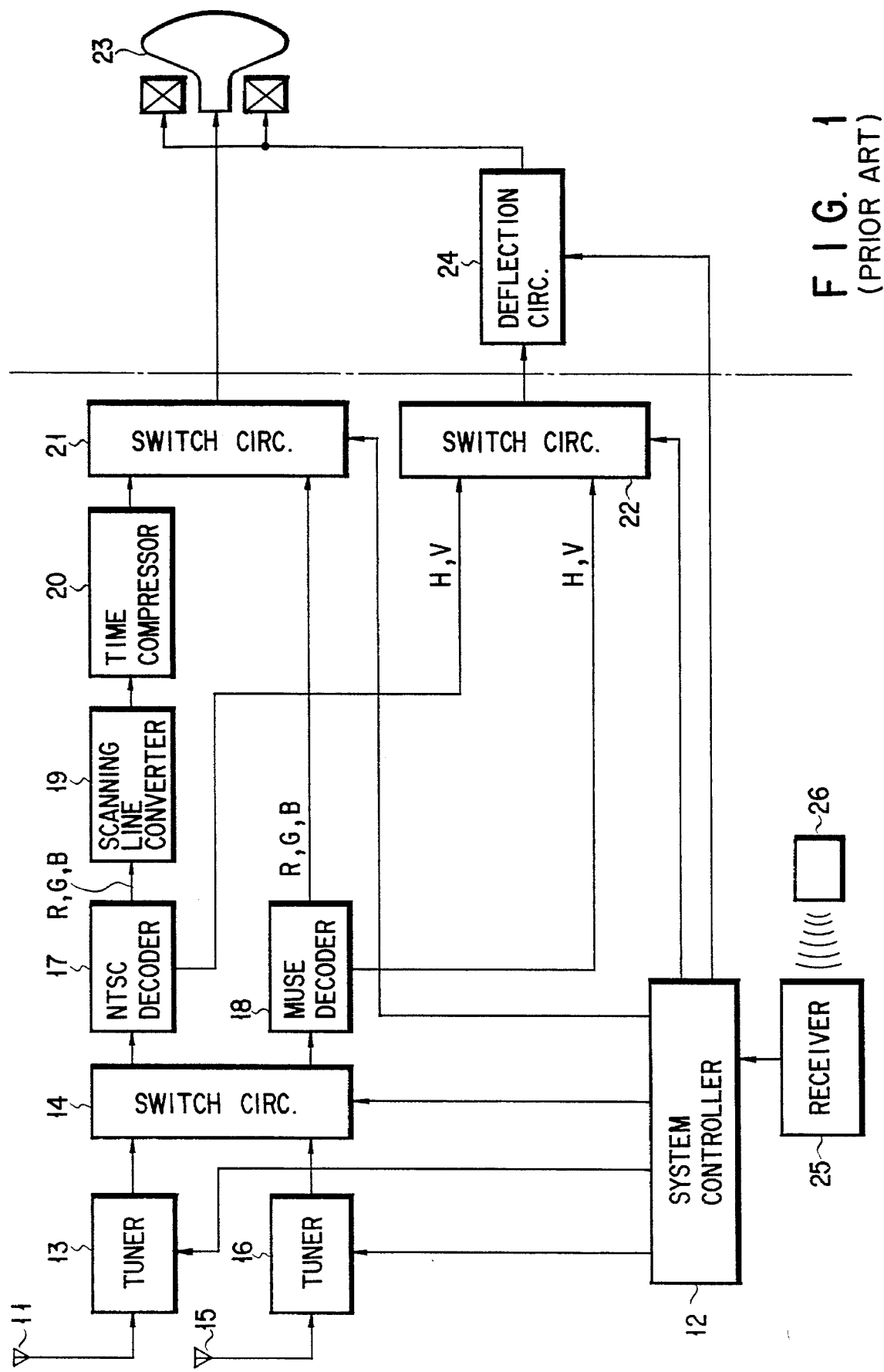
FIG. 1 is a block diagram showing a television receiver which can receive each television signal transmitted by a plurality of types of television systems.

An embodiment of the present invention will be explained in detail with reference to the drawings.

In FIG. 2, a reference numeral 27 is an antenna. A television signal of each of UHF/VHF/CATV broadcasts is received by the antenna 27. Each television signal received by the antenna 27 is selected by a tuner 28, and converted to a base band signal. Thereafter, the base band signal is supplied to one input terminal of a switch circuit 29. A control signal is outputted from a CPU (Central Processing Unit) 30a provided in a system controller 30. The control signal is supplied to the tuner 28 through a data bus 31 and an I/O (input/output) controller 32, so that the signal processing operation is controlled. The tuner 28 receives the television signal of a normal NTSC system and that of an EDTV system, and controls each signal.

A reference numeral 33 is an antenna. A television signal of a BS broadcast is received by the antenna 33. The television signal received by the antenna 33 is selected by a tuner 34, and converted to a base band signal. Thereafter, the base band signal is supplied to the other input terminal of the switch circuit 29. A control signal is also outputted from the CPU 30a provided in the system controller 30. The control signal is supplied to the tuner 34 through the data bus 31 and the I/O controller 32, so that the signal processing operation is controlled. The tuner 34 has a function of receiving the television signal of the normal NTSC system and that of the EDTV system, and controlling each signal.

The switching operation of the switch circuit 29 is performed such that the supply of each base band signal outputted from the tuners 28 and 34 is distributed to an NTSC decoder 35 and an MUSE decoder 36. The control signal outputted from the CPU 30a provided in the system controller 30 is supplied to the switch circuit 29 through the data bus 31 and the I/O controller 37, so that the switching operation of the switch circuit 29 is controlled. The NTSC decoder 35 converts the inputted base band signals to color signals R, G, B, respectively, and outputs these signals to one input terminal of a switch circuit 38.

The MUSE decoder 36 decode-processes the base band signals of the MUSE system, which is band-compressed to 8.1 MHz, to be converted to color signals R, G, B, and outputs these signals to the other input terminal of the switch circuit 38. The NTSC decoder 35 and MUSE decoder 36 fetch a horizontal synchronizing signal H, a vertical synchronizing signal V and a clock signal CK of a horizontal pixel synchronism from the inputted base band signals, respectively. The horizontal synchronizing signal H, the vertical synchronizing signal V and the clock signal CK, which are fetched by the NTSC decoder 35, are supplied to one input terminal of the switch circuit 39. The horizontal synchronizing signal H, the vertical synchronizing signal V and the clock signal CK, which are fetched by the MUSE decoder 36, are supplied to the other input terminal of the switch circuit 39.

A control signal is outputted from the CPU 30a provided in the system controller 30. The control signal is supplied to the switch circuit 38 through the data bus 31 and an I/O controller 37. Thereby, the switch circuit 38 is switched so as to selectively supply the color signals R, G, B, which are obtained by decode-processing the base band signals of the NTSC system, and the color signals R, G, B, which are obtained by decode-processing the base band signals of the MUSE system, to a culling, time conversion and interpolation section 41 provided in a display controller 40.

Also, a control signal is outputted from the CPU 30a provided in the system controller 30. The control signal is supplied to the switch circuit 38 through the data bus 31 and the I/O controller 37. Thereby, the switch circuit 39 is switched in synchronous with the switch circuit 38. In other words, the switch circuit 39 is changed so as to supply the horizontal synchronizing signal H, the vertical synchronizing signal v and the clock signal CK, which correspond to the color signals R, G, B supplied to the display controller 40, to the culling, time conversion and interpolation section 41 provides in the display controller 40.

The culling, time conversion and interpolation section 41 performs the culling processing and the interpolation processing on the inputted color signals R, G, B based on the number of horizontal scanning lines and horizontal pixels of a display 42, which is connected to the section 41. After such processing, the image display can be performed by the display 42. The color signals R, G, B subjected to the culling processing and the interpolation processing are supplied to the display 42 together with various types of synchronizing signals SYNC, which are generated from a display synchronizing generation section 43, in order to correspond to the frequency of the horizontal synchronizing signal H and that of the vertical synchronizing signal V.

The display synchronizing generation section 43 can freely generate the horizontal synchronizing signal H and that of the vertical synchronizing signal V each having the frequency corresponding to the frequency of the horizontal synchronizing signal H and that of the vertical synchronizing signal V. A horizontal dividing value $b_H$ and a vertical dividing value $c_V$ are supplied to the display synchronizing generation section 43 through the data bus 31 and an I/O controller 44. Thereby, the horizontal synchronizing signal H and that of the vertical synchronizing signal V are controlled. Signals showing a clock dividing value $a_{CK}$, a V area, and an H area are supplied to the display synchronizing generation section 43 from CPU 30a through the data bus 31 and the I/O controller 44 so as to set the clock dividing value $a_{CK}$, the V area, and the H area therein. The clock dividing value $a_{CK}$ shows a dividing value for generating a basic clock frequency of the synchronizing signal SYNC for driving the display 42. The V area and H area are data of designating the image display position of the display 42.

The display synchronizing generation section 43 outputs various types of synchronizing signals SYNC for driving the display 42 and a clock CK', a horizontal pulse H', and a vertical pulse V' for controlling the culling, time conversion and interpolation processing section 41. A culling rate and an interpolation rate are provided to the culling, time conversion and interpolation processing section 41 from the CPU 30a through the data bus 31 and the I/O controller 44.

Each base band signal outputted from the tuners 28 and 34 is supplied to a system discrimination circuit 45 so as to discriminate whether or the base band signal is the NTSC type or the MUSE type. The result discriminated by the system discrimination system 45 is written to a system memory 30b provided in a system controller 30 through an I/O controller 46 and the data base 31. In the system controller 30, a program ROM (Read Only Memory) 30c, a calculation RAM (random access memory) 30d, a memory 30e, and an I/O controller 30f are provided. The program ROM 30c stores a program to be supplied to the CPU 30a. The calculation RAM 30d is used when the CPU 30a operates the calculation. The memory 30e stores a frequency $f_H$ of the horizontal synchronizing signal H of the display 42, a frequency $f_V$ of the vertical synchronizing signal v, and an aspect ratio. The I/O controller 30f is provided such that the CPU 30a fetches data of the frequency $f_H$ of the horizontal synchronizing signal H, the frequency $f_V$ of the vertical synchronizing signal V, and the aspect ratio, which are set by the operation of a keyboard 47.

The operation of the display controller 40 is divided into two functions in which the inputted color signals R, G, and B are culled and interpolated so as to correspond to the number of the horizontal scanning lines of the display 42 connected to the display controller 40 and the number of the horizontal pixels. The case of the culling processing will be explained as follows:

As shown in FIG. 3, this case corresponds to a case in which the television signal of the MUSE system is image-displayed in the display 42 of the television receiver corresponding to the normal NTSC system. Various data showing the frequency $f_H$ (15.75 kHz) of the horizontal synchronizing signal H, the frequency $f_V$ (59.94 Hz) of the vertical synchronizing signal V, and the aspect ratio (4:3) are set by the operation of the keyboard 47, and inputted to the CPU 30a through the I/O controller 30f and the data bus 31.

The CPU 30a calculates the culling rate in the vertical direction in the case that the decode-processed television signal of the MUSE system is image-displayed in the display 42. In order to display the television signal of the MUSE system without losing the ratio of the vertical line of the display to the horizontal line of the display 42 having the aspect ratio of 4:3, the culling rate in the vertical direction may be set to 7/20. In other words, the total number of horizontal scanning lines of the television signals of the MUSE system is culled at a culling rate of 7/20. The CPU 30a outputs the calculated culling rate of 7/20 to the culling, time conversion, and interpolation processing section 41 through the data bus 31 and the I/O controller 44.

Figure 4:
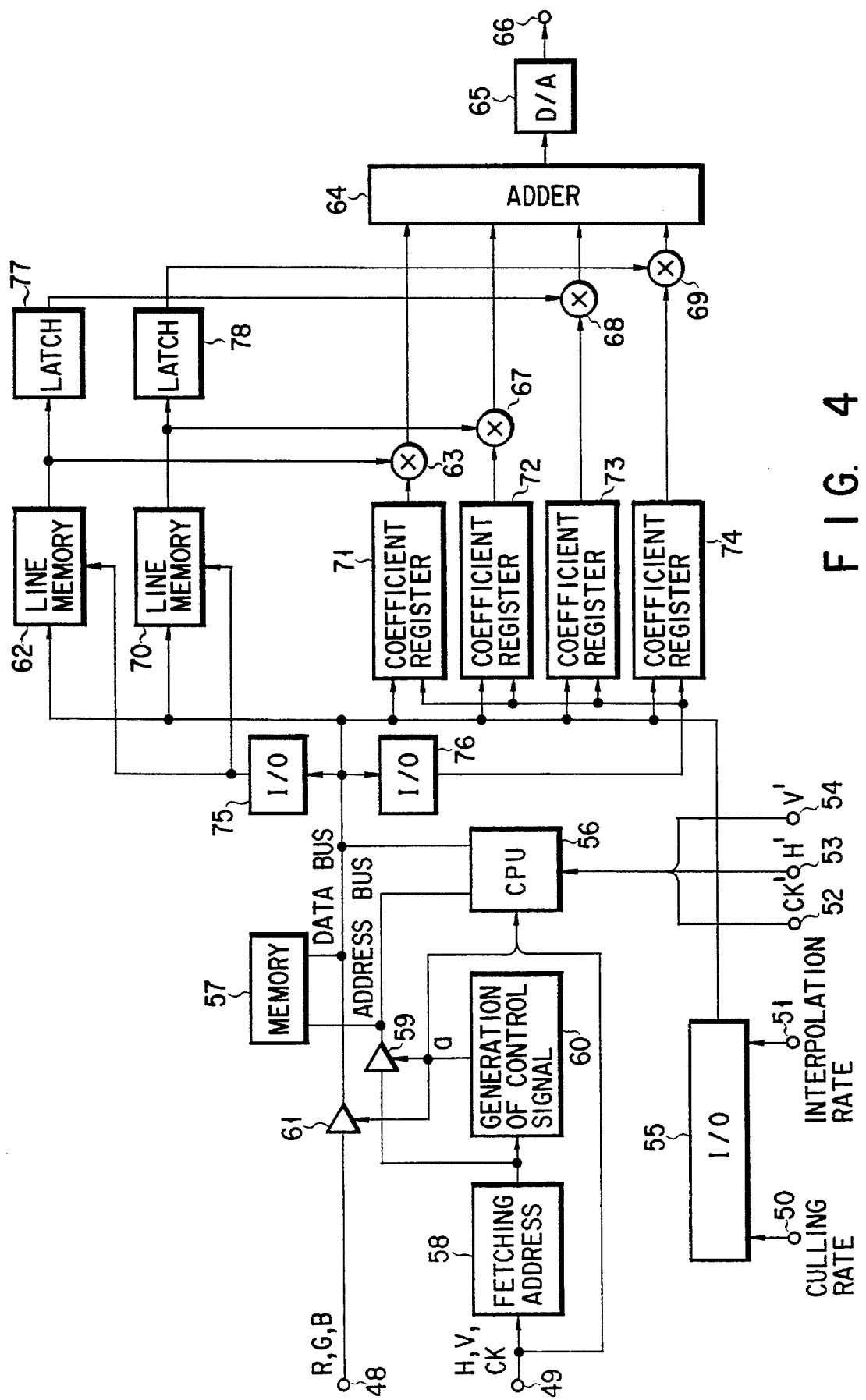
FIG. 4 is a block diagram for explaining the details of culling, time conversion, and interpolation processing section used in the embodiment of FIG. 2.

FIG. 4 shows the specific structure of the culling, time conversion, and interpolation processing section 41. Reference numeral 48 is an input terminal. The color signals R, G, B, which are introduced by the switch circuit 38, are supplied to the input terminal 48. Reference numerals 49, 50, 51, 52, 53 and 54 denote input terminals. The horizontal synchronizing signal H, vertical synchronizing signal V, and the clock signal CK, which are introduced by the switch circuit 39, are supplied to the input terminal 49. The culling rate, which is outputted from the I/O controller 44, is supplied to the input terminal 50. The culling rate, which is outputted from the I/O controller 44, is supplied to the input terminal 51. The clock CK', horizontal pulse H', and vertical pulse V', which are respectively outputted from the display synchronizing generation section 43, are supplied to these input terminals 52, 53, and 54.

The culling rate of 7/20 of the vertical direction, which is outputted from the I/O controller 44, is read to a CPU 56 through the input terminal 50 and an I/O controller 55. The CPU 56 calculates a tap coefficient to be supplied to each line in the vertical direction based on the inputted culling rate of 7/20. A method for culling 7 lines from 20 lines in the vertical direction is carried out by combining a method of FIG. 5A in which l'1 to l'3 are culled from lines l1 to l10 and a method of FIG. 5B in which l'4 to l'7 are culled from l11 to l20.

The color signals R, G, B, which are supplied to the input terminal 48, are fetched to a time axis conversion memory 57. At this time, a fetching address, which is supplied to the time axis conversion memory 57, is generated by a fetching address generator 58. The fetching address generator 58 generates the fetching address based on the horizontal synchronizing signal H, vertical synchronizing signal V and clock signal CK, which are inputted to the input terminal 49. The fetching address generated by the fetching address generator 58 is supplied to the time axis conversion memory 57 through a buffer circuit 59. The color signals R, G, B are written to the time axis conversion memory 57 for an L (low) level period of a control signal a shown in FIG. 6B.

The control signal a is generated by a control signal generator 60 based on the fetching address generated by the fetching address generator 58. The control signal a serves as an interruption input of the CPU 55 at the time of L level, and data is stopped from being read from the time axis conversion memory 57. The control signal a also serves as a control input of a buffer circuit 61. The buffer circuit 61 controls the color signals R, G, B to be supplied to the time axis conversion memory 57, so that writing of color signals R, G, B to the time axis conversion memory 57 is controlled. FIGS. 6C and 6E show writing time at H (horizontal synchronism) period and at V (vertical synchronism) period. For the other periods, the CPU 56 can access the time axis conversion memory 57.

After the color signals R, G, B are written to the time axis conversion memory 57, the above-explained culling processing is performed. FIGS. 7A to 7C show timing of culling processing for an H period, respectively. For a non-display period 1, data l1 is written to a line memory 62. For a display period 2, data l1 read from the line memory 62 is multiplied by a tap coefficient of 1 by a multiplier 63. The calculation result l1 of the multiplier 63 is passed through an adder 64, and converted to an analog color signal by a D/A (digital/analog) converter 65, and is outputted to the display 42 through an output terminal 66. The other multipliers 67, 68, and 69 are set not to produce their outputs in a state that the tap coefficient is 0.

For a non-display period 3, data l4 and l5 are written to line memories 62 and 70. For a display period 4, data l4, which is read from the line memory 62, is multiplied by a tap coefficient of 0.7, and data l5, which is read from the line memory 70, is multiplied by a tap coefficient of 0.3 by the multiplier 67. Both calculation results of the multipliers 63 and 67 are added by the adder 64, and data l2' is generated. FIG. 8 is the contents of the multiplications which are obtained for the periods 1, 3, 5 and 7 by the multipliers 63 and 67. Similar to the data transfer to the line memories 62 and 70, the tap coefficients are set to be coefficient registers 71 and 72 for the non-display period, respectively.

FIG. 9 shows tap coefficients to be set in coefficient registers 71 and 72, respectively. Coefficient registers 73 and 74 for transmitting the tap coefficients to the multipliers 68 and 69 will be described in the description of the interpolation processing. A culling in the horizontal direction is not particularly performed. CPU 56 controls an I/O controller 75, thereby data writing to the line memories 62 and 70 are performed. CPU 56 controls an I/O controller 76, thereby transfer of the coefficients to the coefficient registers 71 and 72 is performed.

By the above operation, the number of lines of the television signal of MUSE system is culled by the culling rate of 7/20. Thereby, the television signal of the MUSE system can be image-displayed without losing the aspect ratio of 4:3 of the display 42.

The interpolation processing will be explained.

In the display, there is a tendency that a larger screen and higher definition will be increasingly advanced in the future. FIG. 10 shows such an example. In the specifications of the display 42, the frequency of the horizontal synchronizing signal H is 33.75 kHz, the field frequency is 60 Hz, and the aspect ratio is 16:9. Various data showing the specifications are input to a CUP 30a through the I/O controller 30f and the data bus 31 by the operation of the keyboard 47. Each of the interpolation rates of the horizontal and vertical direction is calculated by the CPU 30a. The interpolation rate (1.2 times) of the horizontal direction calculated by the CPU 30a and the interpolation rate (2.1 times) of the vertical direction are fetched to the CPU 56 through the input terminal 51 and the I/O controller 55.

Figure 11A:
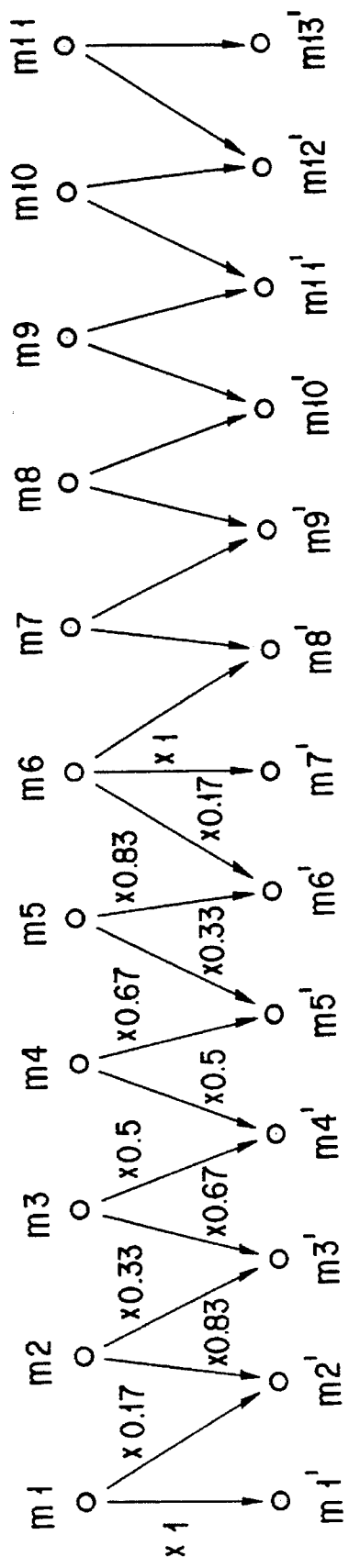
FIGS. 11A and 11B are views for specifically explaining the interpolation processing in a horizontal direction and a vertical direction according to the embodiment of the present invention, respectively.
Figure 11B:
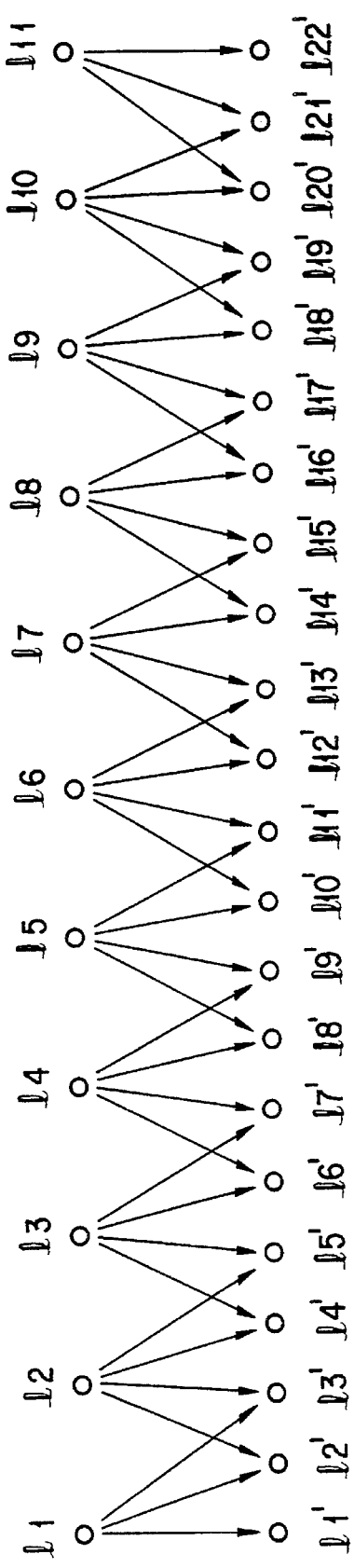

FIG. 11A shows the interpolation processing of the horizontal direction. In the figure, marks m1, m2, m3, m4 . . . m11 show pixel data of the horizontal direction of the received television signal, respectively. Marks m1', m2', m3', m4' . . . m13' show pixel data, which is interpolated for image-displaying on the display 42. Moreover, FIG. 11B shows the interpolation processing of the vertical direction. In the figure, l1, l2, l3, l4, l5, l6, l7 . . . l11 show line data of the vertical direction of the received television signal, respectively. In the FIG., l1', l2', l3', l4', . . . l22' show line data, which is interpolated for image-displaying on the display 42.

Similar to culling processing, data fetching to the time axis conversion memory 57 can be performed. FIG. 12 shows the calculation used to generate line data l1', l2', l3', l4', . . . l22' after each interpolation is performed.

FIGS. 13A to 13C shows timing for performing the interpolation processing, respectively. As mentioned regarding the culling processing, data writing to the line memories 62 and 70 are performed for the non-display period, and the actual collocation is performed for the display period. Similar to the culling processing, the data writing processing to the line memories 62 and 70 are controlled by the CPU 56. For the non-display period 1, line data l1 is fetched, and the calculation is performed to obtain interpolation line data l1'. For the display period 2, line data l2 is fetched, and the calculation shown in FIG. 12 is executed, and interpolation line data l2' is generated.

FIGS. 14A to 14F respectively shows the collocation timing when data is interpolated by the pixel unit in the horizontal and vertical directions. In FIG. 14E, mark b shows a transferring lock to be supplied to the line memories 62 and 70. In FIG. 14F, mark c shows a transferring lock to be supplied to coefficient registers 71 to 74. The transferring lock b is outputted to the CPU 56, and supplied to the line memories 62 and 70 through the I/O controller 75, respectively. The transferring lock c is outputted to the CPU 56, and supplied to the coefficient registers 71 to 74 through the I/O controller 76. Similar to the culling processing, the tap coefficient is set to the coefficient registers 71 to 74 by the CPU 56.

FIGS. 14A to 14F show an example in which pixel data forming the line of l2' is interpolated. For the calculation period 1, pixel data l1m1, which is outputted from the line memory 62, is multiplied by the tap coefficient of 0.52 by the multiplier 63. Pixel data l2m1, which is outputted from the line memory 70, is multiplied by the tap coefficient of 0.48 by the multiplier 67. The multiplication results of both multipliers 63 and 67 are added by the adder 63. Thereby, interpolation pixel data l2'm1' are generated and converted to analog color signals R, G, and B by the D/A converter 65.

FIG. 15 shows the tap coefficient to be set to each of the coefficient registers 71 to 74 for the calculation periods 1 to 13. Each data, which is outputted from each of the lines memories 62 and 70, and each tap coefficient, which is set to each of the coefficient registers 71 and 72, are multiplied by the respective multipliers 63 and 67. At the same time, each data, which is obtained by delaying each output data of the line memories 62 and 70, and each tap coefficient, which is set to each of the coefficient registers 73 and 74, are multiplied by the respective multipliers 68 and 69. Each multiplication result of the multipliers 63, 67 to 69 are added by the adder 64, thereby generating interpolation pixel data is generated for each of the calculation periods 1 to 13. By providing the above processing, the television signal of the NTSC system can be image-displayed without losing the original aspect ratio of 16:9 of the display 42.

The above explained the examples of the culling processing and the interpolation processing. The following will explain the generation of the synchronizing signal SYNC corresponding to the connected display 42.

FIG. 16 shows the specific structure of the display synchronizing generating section 43 of the display controller 40. Reference numerals 79, 80 and 81 are input terminals. The clock dividing value $a_{CK}$, H area, and V area are supplied to the input terminals 79, 80, and 81, respectively. Reference numerals 82 and 83 are input terminals. The horizontal and vertical dividing values $b_H$ and $c_V$ are supplied to the input terminals 82 and 83. In the case of the culling processing, 23 dividing are designated as the clock dividing value $a_{CK}$ to be supplied to the input terminal 79. Then, the clock dividing value $a_{CK}$ is supplied to one input terminal of a comparator 84. A value, which is obtained by counting the clock of 117.8 MHz outputted from an oscillator 85 by a dividing counter 86, is supplied to the other input terminal of the comparator 84. Every time the count value of the dividing counter 86 conforms to the clock dividing value $a_{CK}$, the dividing counter 86 is reset. By repeating this operation, the clock CK' of 48.6 MHz can be obtained from the dividing counter 86. The clock CK' is supplied to the CPU 56 as an interruption signal through the input terminal 52 and supplied to the dividing counter 87, so that the clock CK' is counted.

The horizontal dividing value $b_H$ supplied to the input terminal 82 is supplied to one input terminal of a comparator 88. The count value of the dividing counter 87 is supplied to the other input terminal of the comparator 88. Every time the count value of the dividing counter 87 conforms to the horizontal dividing value $b_H$, the dividing counter 87 is reset. By repeating this operation, the H synchronizing signal of 33.75 kHz can be obtained from the dividing counter 87 if, for example, 1440 dividings are designated as the horizontal dividing value $b_H$. The H synchronizing signal is supplied to the dividing counter 89 and counted, and supplied to an adder 90.

The vertical dividing value $c_V$ supplied to the input terminal 83 is supplied to one input terminal of a comparator 91. The count value of the dividing counter 89 is supplied to the other input terminal of the comparator 91. Every time the count value of the dividing counter 89 conforms to the vertical dividing value $c_V$, the dividing counter 89 is reset. By repeating this operation, the V synchronizing signal of 60 kHz can be obtained from the dividing counter 89 if, for example, 562.5 dividings are designated as the vertical dividing value $c_V$. The V synchronizing signal and the H synchronizing signals are added by the adder 90, so that the synchronizing signal SYNC can be obtained, and transmitted to the display 42 through an output terminal 92.

The count value of the dividing counter 87 and the display area (H area) of the horizontal direction, which is supplied to the input terminal 80, are supplied to a display area generator 93 of the horizontal direction. The display area generator 93 compares the set H area with the count value, and generates a horizontal pulse H'. The horizontal pulse H', serving as an interpolation signal, is outputted to the CPU 56 through the input terminal 53. The count value of the dividing counter 89 and the display area (V area) of the vertical direction, which is supplied to the input terminal 81, are supplied to a display area generator 94 of the vertical direction. The display area generator 94 compares the set V area with the count value, and generates a vertical pulse V'. The vertical pulse V', serving as an interruption signal, is outputted to the CPU 56 through the input terminal 54.

In the case of the interpolation processing, 78 dividings, serving as the clock dividing value $a_{CK}$, 910 dividings, serving as the horizontal dividing value $b_H$, and 262.5 dividings, serving as the vertical dividing value $c_V$, are set. At this time, the clock CK' of 14.3 MHz, the H synchronizing signal of 15.7 kHz, and the V synchronizing signal of 60 Hz can be obtained.

FIGS. 17 to 19 show the operation flow charts of CPU 56. These flow charts mainly describe the parts which the CPU 56 basically executes in the culling processing and the interpolation processing. More specifically, FIG. 17 shows the flow chart showing the interpolation processing, which is the main processing of the CPU 56. If the interruption is started (step S1), the CPU 56 stops the access to the time axis conversion memory 57 in step S2, the operation is returned to the processing program, which is before the interruption. Since the data writing to the time axis conversion memory 57 is performed for the L level of the control signal a, the CPU 56 is prohibited from accessing to the time axis conversion memory 57 during the writing.

FIG. 18 shows the flow chart showing a V' synchronizing processing. If the interruption is started (step S4), the CPU 56 clears a line counter register (not shown) provided therein in step S5. Thereafter, in step S6, the culling rate and the interpolation rate are read through the I/O controller 55. In the above example, in the case of the culling case, the culling rate of the vertical direction of 7/20 is read. In the case of the interpolation case, the interpolation rate of the horizontal direction of 1.2 and that of the vertical direction of 2.1 are read. In step S7, the CPU 56 executes each calculation of the culling coefficient and the interpolation coefficient as shown in FIGS. 5A, 5B, 9, 11A, 11B, 12, and 15. This calculation is performed during the vertical feedback period, which is from the detection of the vertical synchronizing signal V period to the start of the image signal interpolation. Thereafter, in step S8, the operation is returned to the processing program, which is before the interruption.

FIG. 19 shows the flow chart showing an H' synchronizing interruption processing, that is, the processing to transfer various data for the non-display period. If the interruption is started (step S9), the CPU 56 transfers data to the line memories 62 and 70 in step S10, the tap coefficient is set to each of the coefficient registers 71 to 74. At this time, the transfer clock is supplied to the line memories 62, 70 and the coefficient registers 71 to 74 through the I/O controllers 75 and 76, respectively, as mentioned above. The transfer timing is as shown in FIGS. 13A to 13C. Thereafter, in step S12, the CPU 56 set increment by +1 to the line counter register. Then, in step S13, the operation is returned to the processing, which is before the interruption.

FIG. 20 shows the operation flow chart of the CPU 30a provided in the system controller 30. The main function of CPU 30a is that the system of the tuned broadcast, the specifications of the connected the display 42 such as horizontal frequency, vertical frequency, aspect ratio is fetched and the culling rate and the interpolation rate are calculated. In other words, the operation flow chart of FIG. 20 shows the case in which the designation of the broadcast to be tuned and that of the specifications of the display are carried out by the keyboard 47. The interruption processing is set as a basic processing.

In step S14, the CPU 30a selects the tuners 28 and 34 through the I/O controller 32. In step S15, the CPU 30a fetches the system discrimination result of the television signal outputted from the selected television signal through the I/O controller 46. In step S16, the CPU 30a sets the fetched system discrimination result to the system memory 30b. In step S17, the CPU 30a fetches the specifications of the display inputted by the keyboard 47 through the I/O controller 30f. In step S18, the fetched specifications of the display 42 is written to the memory 30e.

In step S19, CPU 30a calculates the culling rate and the interpolation rate based on the system data recorded in the system memory 30b and the specification of the display 42 recorded in the memory 30e, and outputs the calculated rates to the display control section 40. In step S20, the CPU 30a outputs the clock dividing value $a_{CK}$, horizontal dividing value $b_H$, vertical dividing value $c_V$, H area, and V area to the display section 40.

FIG. 21 shows one example of the calculation of the culling rate. In step S21, the number of lines of the display 42 is calculated from the horizontal frequency and the vertical frequency of the the specifications of the display 42 inputted by the keyboard 47. In this example, the number of lines of the display 42 having horizontal frequency (15750 Hz)×2/vertical frequency (59.94 Hz)=525 can be obtained. In step S22, the CPU 30a calculates the compression ratio foe compression-processing the received television signal based on the aspect ratio of the received television signal and the aspect ratio of the display 42. In this example, since 9/(16×¾)=¾, the vertical direction may be set to be ¾.

In step S23, the CPU 30a obtains the actual number of lines of the display. When the television signal whose aspect ratio is 16:9 is displayed on the display 42 whose aspect ratio is 4:3, the number of lines of the vertical direction is ¾ of 525, that is, 393. In step S24, the CPU 30a calculates the culling rate of the number of lines. In this example, about 7/20 is obtained as the culling rate of the number of lines, and the value is transmitted to the display controller 40 as the culling rate.

Therefore, according to the above-mentioned embodiment, similar to the the television signal of the NTSC system and that of the MUSE system, the signal processings (culling, time axis conversion, and interpolation) are provided to the each television signal transmitted in the plurality of types of television systems so as to adjust the specifications (the horizontal frequency, vertical frequency, and aspect ratio). Therefore, the television signal of the various types of systems can be displayed by the large types of displays 42 whose synchronizing frequency and aspect ratio are different. The above embodiment explained that the base band signal obtained from the tuners 28 and 34 was culled, time-axially converted, interpolation-processed. However, according to the present invention, it is possible to process the base band signal, which is directly inputted from the outer unit. Moreover, means for inputting the specifications of the display 42 is not limited to the keyboard 47. For example, the remote-controlling operation may be used.

Figure 22:
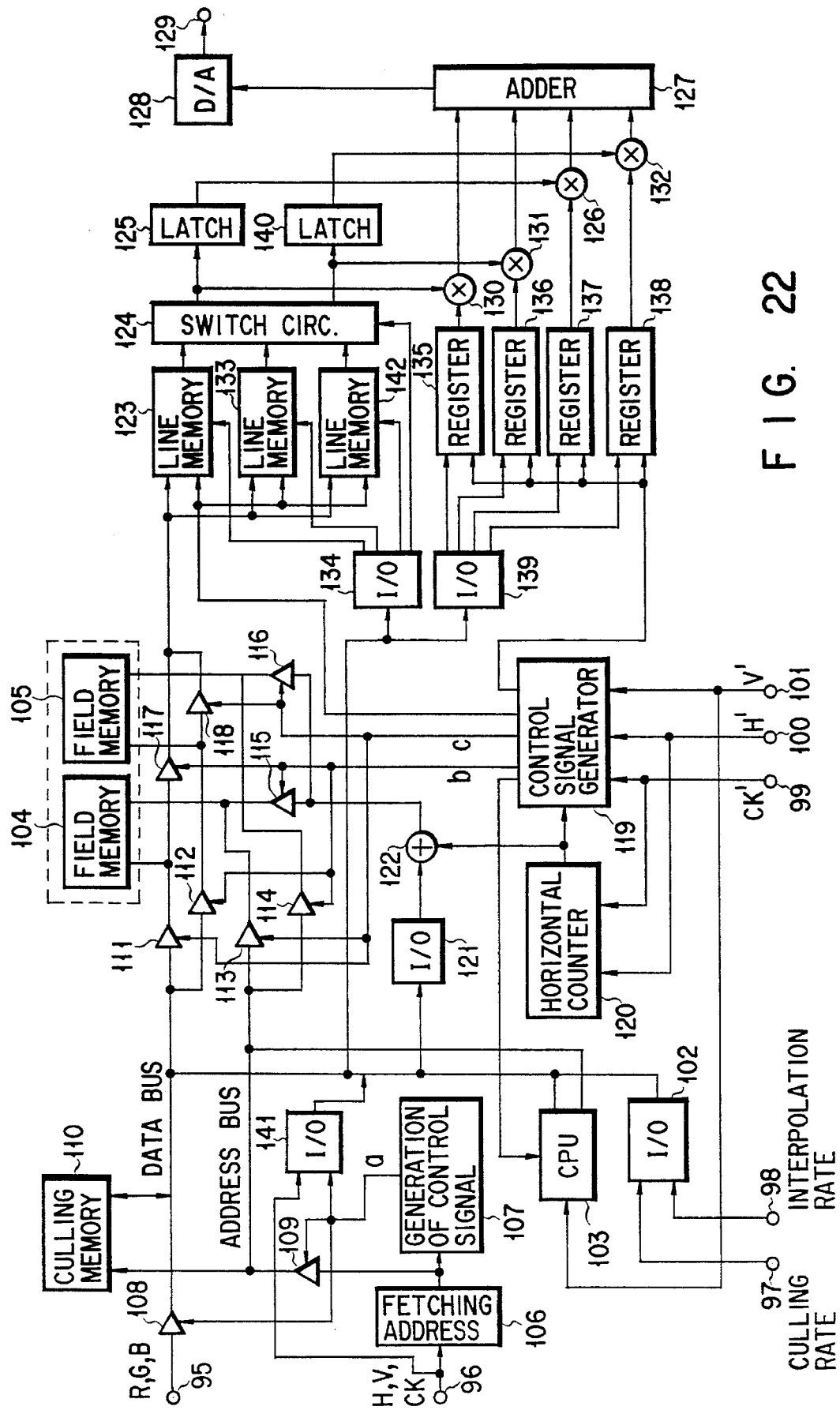
FIG. 22 is a block diagram for explaining the other example of the culling, time conversion, and interpolation processing section used in the embodiment of the present invention.

FIG. 22 shows other example of the culling, time conversion, and interpolation processing section 41. Reference numeral 95 is an input terminal. Color signals R, G, and B, which are introduced from the switching circuit 38, are supplied to the input terminal 95. Reference numeral 96 is an input terminal. The horizontal synchronizing signal H, which is introduced from the switching circuit 39, the vertical synchronizing signal V, clock signal CK are supplied to the input terminal 96. Reference numeral 97 is an input terminal. The culling rate, which is outputted from the I/O controller 44, is supplied to the input terminal 97. Reference numeral 98 is an input terminal. The interpolation rate, which is outputted from the I/O controller 44, iS supplied to the input terminal 98. Reference numerals 99, 100 and 101 are input terminals. The clock CK', horizontal pulse H' and vertical pulse V', which are outputted from the display synchronizing generation section 43, respectively, are supplied to the input terminals, respectively.

The following will explain the case that the television signal of the MUSE system is image-displayed on the display 42 of the television receiver corresponding to the normal NTSC system. In this case, the culling rate of the vertical direction is 7/20. The culling rate of the vertical direction, which is outputted from the I/O controller 44, is read by a CPU 103 through the input terminal 97 and an I/O controller 102. The CPU 103 calculates the tap coefficient to be provided to each line of the vertical direction based on the inputted culling rate of 7/20. A method for culling 7 lines from 20 lines of the vertical direction is performed by combing the method in which three lines are culled from ten lines as shown in FIG. 5A and a method in which four lines are culled from ten lines a shown in FIG. 5B.

The CPU 103 calculates the tap line of each of the liens. Thereafter, the culling calculation processing is executed by the timing shown in FIGS. 23A and 23B. In FIGS. 23A and 23B, the CPU 103 performs the calculation of 11×1 for the period 1, and the calculation result of 11' is written to either field memory 104 or 105 for the time axis conversion. The CPU 103 calculates the calculation of (14×0.7)+(15×0.3) for the period 2. Then, the calculation result of 12' is written into ether the field memories 104 and 105. Thereafter, even for the periods 3, 4, and 5, the same calculation processing is repeated, and the calculation result is written into either one of the field memories 104 and 105.

FIGS. 24A to 24C show the calculation timing of a CPU 103 for pixel unit, respectively. Since the received television signal is a MUSE system, the pixel rate is 20 nsec, and the calculation is performed for the period T of the control signal a shown in FIG. 24B. The control signal a is generated by a control signal generator 107 based on an address signal, which is produced by a fetching address generator 106. The control signal a controls buffer circuits 108 and 109 so as to prevent collision between a data bus of CPU 103 and an address bus. Data is written to a culling memory 110 foe the period of an L level of the control signal a. For the other periods, the CUP 103 can access the culling memory 110.

FIGS. 25A to 25E will explain data writing and reading to/from the field memories 104 and 105 foe the time axis conversion. When data is written to the field memory 104, data, which is recorded in the field memory 105, is read. When data is written to the field memory 105, data, which is recorded in the field memory 104, is read. At this time, buffer circuits 111 to 118, which are connected to the address bus and data bus of the field memories 104 and 105, is controlled based on the control signals b and c. The control signals b and c are generated from a control signal generator 119.

Regarding the reading addresses to be supplied to the field memories 104 and 105, the address of the horizontal direction is generated by a horizontal counter 120. The address of the vertical direction is generated by adding data, which is generated by the CPU 103 and outputted through an I/O controller 121, and output data of the horizontal counter by use of an adder 122.

Since the culling processing is performed in the above case, data read from the field memories 104 and 105 are outputted without being interpolated. Data read from the field memories 104 and 105 are passed through a line memory 123, a switch circuit 124 and a latch circuit 125, and multiplied by tap coefficient of 1 by use of a multiplier 126. Output data of the multiplier 126 is passed through an adder 127 and converted to an analog color signal by a D/A converter 128, and outputted to the display 42 through an output terminal 129. Thereby, the television signal of the MUSE system can be image-displayed without losing the original aspect ratio in the form as shown in FIG. 3, right side. The tap coefficient of 0 is set to multipliers 131 and 132 so that no output is produced.

FIGS. 26A and 26B show data writing and reading timing to the line memory 123, respectively. FIG. 9 shows the number of lines per 1V (one field) at the time of reading. FIGS. 27A and 27B shows the number of lines per frame, and the number of the lines is 393 in the case of the display 42 whose aspect ratio is 4:3. For the field unit, 196 lines and 197 lines are alternately set.

The interpolation processing will be explained.

In the display 42, there is a tendency that a larger screen and higher definition will be increasingly advanced in the future. FIG. 28 shows such an example. In the specifications of the display 42, the horizontal frequency is 135 kHz, the field frequency is 60 Hz, and the aspect ratio is 8:3. Various data showing the specifications are input to the CUP 30a through the I/O controller 30f by the operation of the keyboard 47. Each of the interpolation rates of the horizontal and vertical direction is calculated by the CPU 30a. The interpolation rate (4 times) of the horizontal direction calculated by the CPU 30a and the interpolation rate (2 times) of the vertical direction are fetched to the CPU 103 through the input terminal 91 and the I/O controller 102. The interpolation rate (4 times) of the horizontal direction is calculated assuming that the horizontal frequency (135 kHz) of the display 42 is four times the horizontal frequency (33.75 kHz) of the television signal of MUSE system.

Figure 29:
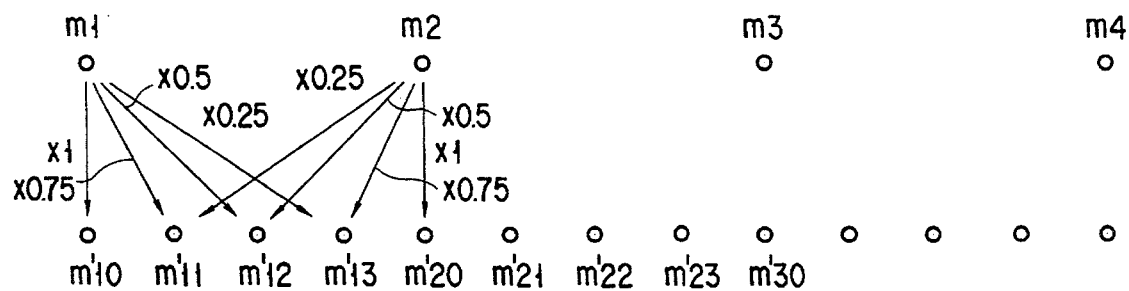
FIG. 29 is a view for specifically explaining the interpolation processing in the vertical direction in the other example.
Figure 30:
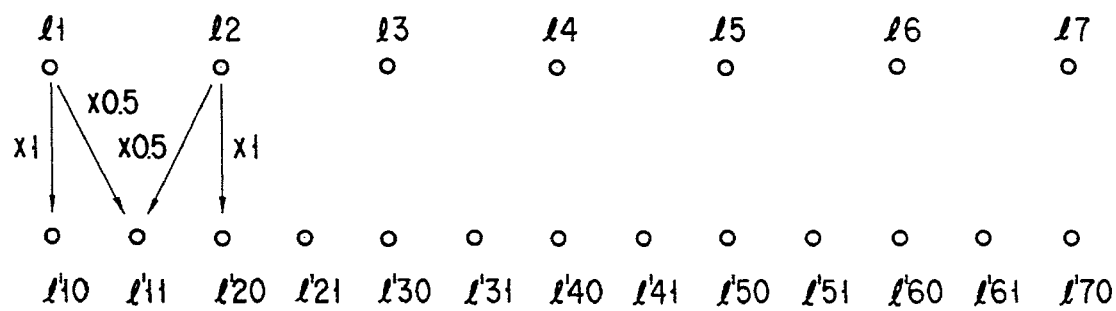
FIG. 30 is a view for specifically explaining the interpolation processing in the horizontal direction in the other example.

FIG. 29 shows the interpolation processing of the horizontal direction. In the figure, marks m1, m2, m3, m4 . . . show pixel data of the received television signal, respectively. Marks m10', m11', m12', m13', m20', m21', m22', m22', m23', m30' . . . show data, which is interpolated for image-displaying on the display 42. Moreover, FIG. 30 shows the interpolation processing of the vertical direction. In the figure, l1, l2, l3, l4, l5, l6, l7, . . . show line data of the vertical direction of the received television signal, respectively. In the figure, l10', l11', l20', l21', l30', l31', l40', l41', l50', l51', l60', l61', l70' show line data, which is interpolated for image-displaying on the display 42.

Figure 31A:
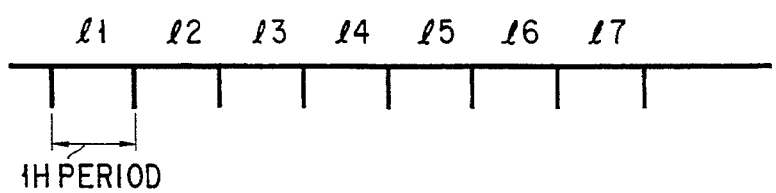
FIGS. 31A and 31B are views for explaining the writing timing of data to the field memory when the interpolation processing is performed in the same vertical direction, respectively.
Figure 31B:
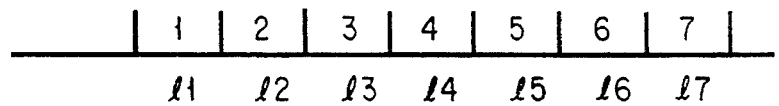

Since no culling is provided in the interpolation processing, the television signal is written to the field memories 104 and 105 by the timing shown in FIGS. 31A and 31B. The writing timing is the same as explained in the culling processing. FIGS. 32A to 32C show the interpolation calculation timing, respectively. For the non-display period 1, line data l1 is set to the line memory 123, and for the display period 2, line data l10' is calculated and outputted. For the non-display period 3, line data l2 is set to a line memory 133 and, for the display period 4, the interpolation calculation is performed, and line data l11' is outputted. The line memories 123 and 124 are designated by the CPU 103 via an I/O controller 134.

FIGS. 33A to 33E show the timing of the output of the interpolation calculation, respectively. FIG. 34 shows the tap coefficients, which are sequentially set to coefficient registers 135, 136, 137, and 138. The tap coefficient is designated by the CPU 103 via an I/O controller 139. FIGS. 33A to 33E show the case that line data l11' is generated by use of line data l1 and l2 shown in FIG. 30. In the line memory 123, line data l1, which is expressed by e.g., l1m1, l1m2, l1m3 in the form of pixel unit, is stored. In the line memory 133, line data l2, which is expressed by e.g., l2m1, l2m2, l2m3 in the form of pixel unit, is stored.

For the calculation period 1, a multiplier 130 performs the calculation of l1m1×0.5, and a multiplier 131 performs the calculation of l2m1×0.5. At this time, the multipliers 126 and 132 perform the multiplication of the tap coefficient of 0, respectively, so that their output become 0. The outputs of the respective multipliers 126 and 130 to 132 are added by the adder 127, and outputted as data l11'm10'. The contents of the multipliers 126 and 130 to 132 for calculation periods 1 to 4 are shown in FIG. 35, respectively.

The I/O controller 134 performs the switching control of the switching circuit 124. In this example, the switching circuit 124 is controlled in order that the output of the line memory 123 and that of the line memory 133 are supplied to the latch circuit 125 and a latch circuit 140, respectively.

Even in a case that the culling, time conversion and interpolation section 41 is used, the structure of the display synchronizing generation section 43 provided in the display controller 40 is the same as shown in FIG. 16.

In the case of the culling processing, 163 dividings are designated as a clock dividing value $a_{CK}$ to be supplied to the input terminal 79. The comparator 84 compares the clock dividing value $a_{CK}$ with a value, which is obtained by counting the clock of 332.8 MHz outputted from the oscillator 85 by use of the dividing counter 86. Every time the count value of the dividing counter 86 conforms to the clock dividing value $a_{CK}$, the dividing counter 86 is reset. By repeating this operation, the clock CK' of 14.3 MHz can be obtained from the dividing counter 86. The clock CK' is supplied to the control signal generator 119 and the horizontal counter 120 through the input terminal 99, and supplied to the dividing counter 87, so that the clock CK' is counted.

The comparator 88 compares the horizontal dividing value $b_H$ supplied to the input terminal 82 with the count value of the dividing counter 87. Every time the count value of the dividing counter 87 conforms to the horizontal dividing value $b_H$, the dividing counter 87 is reset. By repeating this operation, the H synchronizing signal of 15.7 kHz can be obtained from the dividing counter 87 if, for example, 910 dividings are designated as the horizontal dividing value $b_H$. The H synchronizing signal is supplied to the dividing counter 89 and counted, and supplied to an adder 90.

The comparator 91 compares the vertical dividing value $c_V$ supplied to the input terminal 83 with the count value of the dividing counter 89.

Every time the count value of the dividing counter 89 conforms to the vertical dividing value $c_V$, the dividing counter 89 is reset. By repeating this operation, the V synchronizing signal of 60 Hz can be obtained from the dividing counter 89 if, for example, 525 dividings are designated as the vertical dividing value $c_v$. The V synchronizing signal and the H synchronizing signals are added by the adder 90, so that the synchronizing signal SYNC can be obtained, and transmitted to the display 42 through an output terminal 92.

In the case of the interpolation processing, 2 dividings are set as the clock dividing value $a_{CK}$. 8640 dividings are set as the horizontal dividing value $b_H$. 2250 dividings are set as the vertical dividing value $c_V$, are set. At this time, the clock CK' of 1166.4 MHz, the H synchronizing signal of 135 kHz, and the V synchronizing signal of 60 Hz can be obtained.

Figure 36:
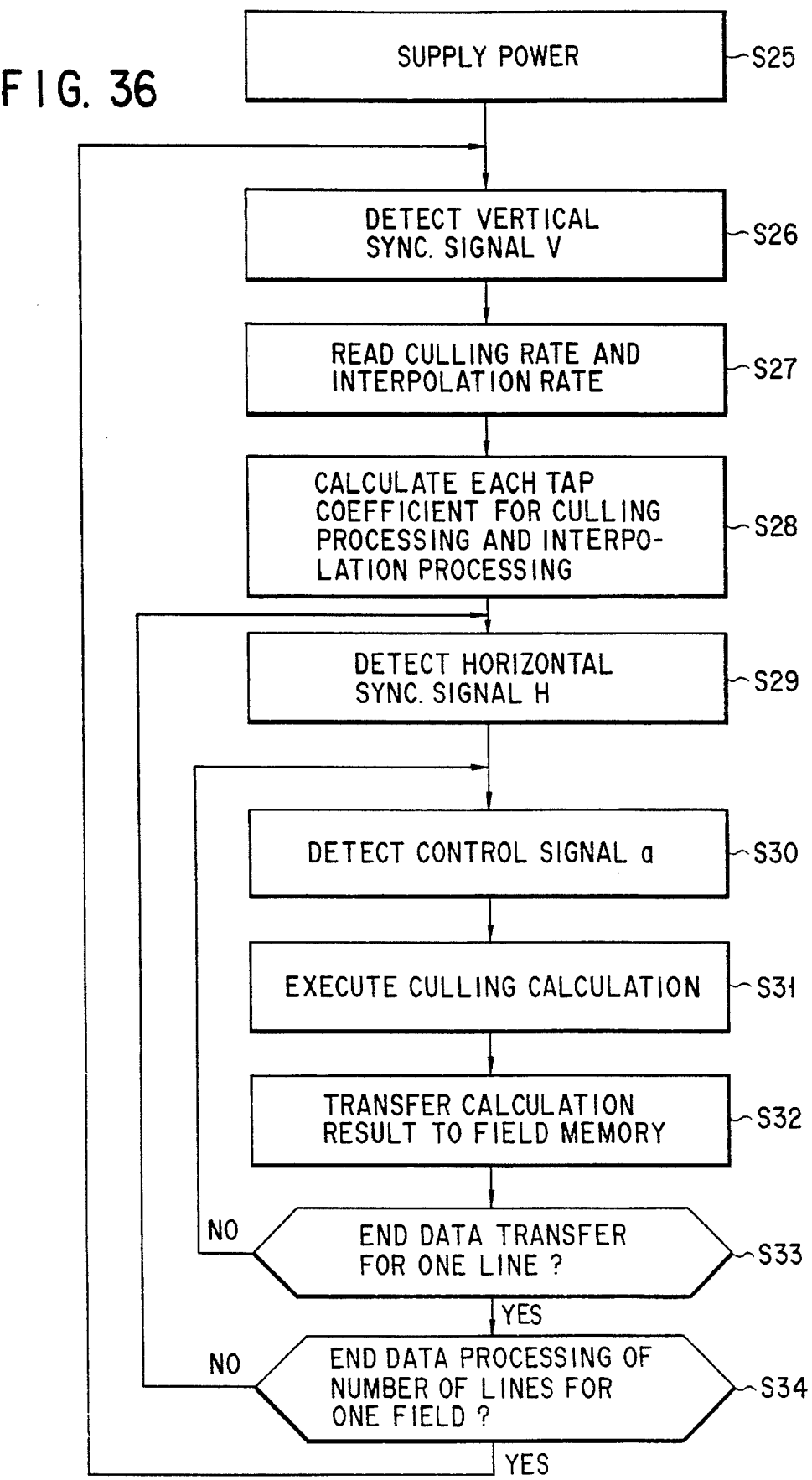
FIG. 36 is a flow chart for explaining a processing operation of the CPU used in the culling, time conversion and interpolation processing section in the other example.

FIG. 36 shows the operation flow charts of CPU 103. This flow charts mainly describes the parts which the CPU 103 basically executes in the culling processing and the interpolation processing. More specifically, if the power supply is on (step S25), the CPU 103 detects the vertical synchronizing signal V through the I/O controller 141 in step S26. In step S27, the CPU 103 reads the culling rate and the interpolation rate through the I/O controller 102. According to the above embodiment, in the case of the culling processing, data of 7/20 is read in the vertical direction, and the case of the interpolation processing, data of 4 times horizontally and 2 times vertically is read.

In step 28, the CPU 103 calculates each tap coefficient for the culling processing and the interpolation processing. This calculation is performed during the vertical feedback period, which is from the detection of the vertical synchronizing signal V period to the start of the image signal interpolation. In FIGS. 5A, 5B, 29, and 30, the tap coefficient for every line is shown. In step S29, the CPU 103 detects the horizontal synchronizing signal H through the I/O controller 141. If the the horizontal synchronizing signal H is detected, the CPU 103, in step S30, detects the control signal a through the I/O controller 141, thereby detecting the pixel to be processed for every line.

If the control signal a is detected, the CPU 103 executes the culling calculation by the timing shown in FIGS. 24A to 24C in step S31. If the culling calculation is ended, the CPU 103 transfers the calculation result to the field memories 104 and 105 in step S32. In step S33, the CPU 103 discriminates whether or not the data transfer for one line is ended. If it is discriminated that the data transfer for one line is not ended (NO), the operation is returned to step S30.

On the other hand, if it is discriminated, in step S33, that the data transfer for one line is ended (YES), the CPU 103 discriminates whether or not the processing of the number of lines for one field is ended in step S34. If it is discriminated that the processing of the number of lines for one field is not ended (NO), the operation is returned to step S29. If it is discriminated that the processing of the number of lines for one field is ended (YES), the operation is returned to step S26.

The CPU 103 executes the culling processing by a main routine until data is inputted to the field memories 104 and 105. Data set, which is used to perform the interpolation processing after reading data from the field memories 104 and 105, is executed by an interruption processing routine.

The CPU 103 performs the designation of the line memory for the interpolation calculation and the setting of tap coefficient data to the coefficient register. The timing detection is realized by a V' synchronizing interruption processing and an H' synchronizing interruption processing.

Figure 37:
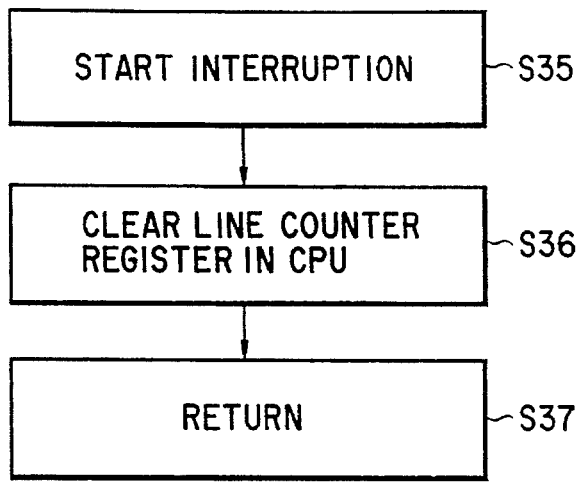
FIG. 37 is a flow chart for explaining a vertical synchronizing interruption processing operation of the CPU used in the culling, time conversion and interpolation processing section.

FIG. 37 is a flow chart showing the V' synchronizing interruption processing. If the interruption is started in step S35, the CPU 103 clears the line counter register provided inside, and the operation is returned to the processing program, which is before the interruption.

Figure 38:
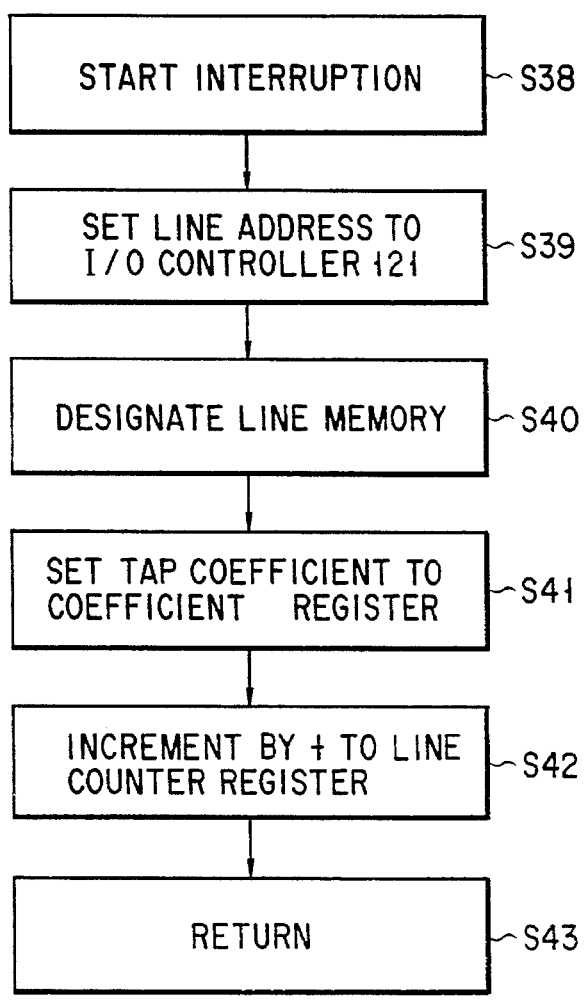
FIG. 38 is a flow chart for explaining a horizontal synchronizing interruption processing operation of the CPU used in the culling, time conversion and interpolation processing section.

FIG. 38 is a flow chart showing the H' synchronizing interruption processing. If the interruption is started in step S38, the CPU 103 refers the value of the line counter register, and sets the line address to be processed to the I/O controller 121 in step S39. The set address is used as a writing address of the field memory 104 and 105.

In step S40, the CPU 103 designates the line memories 123, 133, and 142 to which data read from the field memories 104 and 105 through the I/O controller 134. In step S41, the CPU 103 sets the tap coefficient to each of the coefficient registers 135 to 138 through the I/O controller 139. In step S42, the CPU 103 sets increment by +1 to the line counter register. Thereafter, in step S43, the operation is returned to the processing program, which is before the interruption. The interpolation is executed every time H' synchronizing interruption occurs, so that the interpolation processing for one field is finally performed.

Therefore, even by the culling, time conversion and interpolation processing section 41 structured as shown in FIG. 22, it is possible to provide the signal processing (culling, time axis conversion, interpolation) to the plurality of the television signals transmitted by the various system such as NTSC system and MUSE system to adjust to the specifications of the connected display 42 (horizontal frequency, vertical frequency, aspect ration). Thus, the television signal of the various systems can be displayed by the various types of the displays 42 whose synchronizing frequency and aspect ratio are different.

Moreover, in the culling, time conversion and interpolation processing section 41 structured as shown in FIG. 22, the time axis conversion processing is performed after the culling processing is finished. Due to this, unlike the time axis conversion memory 57 of FIG. 4 storing all inputted color signals, according to the present invention, there is an advantage in that the memories whose memory capacities are small can be used as the filed memories 104 and 105 for the time axis conversion processing.

The present invention is not limited to the above mentioned embodiment. The present invention can be variously modified without departing from the gist of the invention.

What is claimed is:

1. A television signal processor comprising:

a signal processing section having means for determining a system from which the television signal processor receives a television signal, the signal processing section decoding the received television signal in accordance with the determined system;

a display for displaying an image corresponding to the decoded television signal; and controlling means for processing the decoded television signal for the display based on specification data of the display, the controlling means including:

means for inputting the specification data for the display, means for calculating one of a culling rate and an interpolating rate based on the decoded television signal, the culling rate being one of a horizontal culling rate and a vertical culling rate, and the interpolating rate being one of a horizontal interpolating rate and a vertical interpolating rate, based on the input specification data and the result of determination performed by the system determining means, culling means for determining a first coefficient based on the culling rate calculated by the calculating means, and for executing one of a horizontal and vertical culling process with respect to the decoded television signal by multiplying the decoded television signal by coefficients corresponding to the first coefficient, interpolating means for determining a second coefficient based on the interpolating rate calculated by the calculating means, and for executing one of a horizontal and vertical interpolating process with respect to the decoded television signal by multiplying the decoded television signal by coefficients corresponding to the second coefficient, time conversion means for performing a time-axis conversion process with respect to the decoded television signal based on the specification data input for the display, the time-axis conversion process making the decoded television signal correspond to a synchronizing frequency of the display, and synchronizing processing means for generating a synchronizing signal for driving the display based on the specification data for the display, and for outputting the synchronizing signal to the display, so that the image corresponding to the decoded television signal can be displayed on the display.

2. The television signal processor according to claim 1, wherein in the controlling means, the culling means and the interpolating means are arranged at a rear stage of the time conversion means.

3. The television signal processor according to claim 1, wherein the culling means is arranged at a front stage of the time conversion means, and the interpolating means is arranged at a rear stage of the time conversion means.

4. The television signal processor according to claim 1, wherein the time conversion means comprises storing means for sequentially writing the decoded television signal based on its synchronizing frequency, and for sequentially reading the decoded television signal based on a frequency of the synchronizing signal for the display generated by the synchronizing processing means.

5. The television signal processor according to claim 1, wherein the signal processing section comprises tuning means for selecting one television signal from television signals transmitted by a plurality of types of television systems, a plurality of decoding means provided to correspond to each of the plurality of types of television systems transmitting television signals, first switching means for introducing the television signal selected by the tuning means to the decoding means corresponding to the television system of the selected television signal, and second switching means for introducing an output signal of the decoding means, obtained by decoding the television signal selected by the tuning means, to the controlling means.

6. The television signal processor according to claim 5, wherein the specification data of the display includes the synchronizing frequency and an aspect ratio.

7. The television signal processor according to claim 5, wherein the plurality of types of television systems includes a NTSC system and a MUSE system.

* * * * *